US008589036B2

(12) United States Patent
Bowen et al.

(10) Patent No.: US 8,589,036 B2
(45) Date of Patent: Nov. 19, 2013

(54) METHOD AND SYSTEM FOR AUTOMATICALLY SETTING, ADJUSTING, AND MONITORING LOAD-BASED LIMITS ON A WELL SERVICE RIG

(75) Inventors: Jay Charles Bowen, Midland, TX (US); Roger Phillip Burke, Midland, TX (US); Howard Adrian Neal, Calgary (CA); Derrek Yorga, Calgary (CA)

(73) Assignee: Key Energy Services, LLC, Houston, TX (US)

( * ) Notice: Subject to any disclaimer, the term of this patent is extended or adjusted under 35 U.S.C. 154(b) by 211 days.

(21) Appl. No.: 13/161,736

(22) Filed: Jun. 16, 2011

(65) Prior Publication Data

US 2011/0313626 A1 Dec. 22, 2011

Related U.S. Application Data

(60) Provisional application No. 61/355,772, filed on Jun. 17, 2010.

(51) Int. Cl.
*G06F 19/00* (2011.01)

(52) U.S. Cl.
USPC ............................................................ 701/50

(58) Field of Classification Search
USPC .............................. 701/50, 53, 55, 56, 59, 60
See application file for complete search history.

(56) References Cited

U.S. PATENT DOCUMENTS

2007/0056727 A1* 3/2007 Newman ................. 166/250.01
2009/0063054 A1* 3/2009 Newman ........................... 702/6

* cited by examiner

*Primary Examiner* — Kim T Nguyen
(74) *Attorney, Agent, or Firm* — King & Spalding LLP

(57) ABSTRACT

A method and system for automatically setting adjusting and monitoring load-based limits is capable of monitoring the hookload, rig weight and combined measured weight and compare those parameters to limits. If any of the hookload, rig weight or measured weight should increase to a level beyond its limit, the system is able to adjust the operation of the well service rig to limit damage to the equipment and danger to the operators and service personnel. The system is also capable of adjusting each of the limits as the weight of the rig and actual hookload change over time while conducting an activity to maintain the respective limits in the most beneficial range.

19 Claims, 15 Drawing Sheets

METHOD AND SYSTEM FOR AUTOMATICALLY SETTING, ADJUSTING, AND MONITORING LOAD-BASED LIMITS ON A WELL SERVICE RIG

RELATED APPLICATION

This application claims priority under 35 U.S.C. §119 to U.S. Provisional Patent Application No. 61/355,772, titled "System, Methods, and Devices for an Auto Hook Load Limiter," filed on Jun. 17, 2010, the entire contents of which are hereby fully incorporated herein by reference.

TECHNICAL FIELD

The technical field generally pertains to equipment used for servicing wells. More specifically the field of the exemplary embodiments pertains to an analysis of well service rig loads and rig load data to determined hookload and other rig load limits and to monitor the data to determine if overload conditions based on those limits occurs.

BACKGROUND OF THE INVENTION

After a well has been drilled, it must be completed before it can produce gas or oil. Once completed, a variety of events may occur to the formation causing the well and its equipment to require a "work-over." For purposes of this application, "work-over" and "service" operations are used in their very broadest sense to refer to any and all activities performed on or for a well to repair or rehabilitate the well, and also includes activities to shut in or cap the well. Generally, work-over operations include such things as replacing worn or damaged parts (e.g., a pump, sucker rods, tubing, casings, and packer glands), applying secondary or tertiary recovery techniques, such as chemical or hot oil treatments, cementing the wellbore, and logging the wellbore, to name just a few. Service operations are usually performed by or involve a mobile work-over or well service rig (collectively hereinafter a "well service rig" "service rig" or "rig") that is adapted to, among other things, pull the well tubing, rods or casings (referred to collectively hereinafter as "tubing") and also to run the tubing back in to the well. Typically, these service rigs are mobile, such that they are capable of being moved from one location to another. The well service rig also typically includes extendible, jack-up derrick complete with draw works and block.

During tubing removal, a rig operator typically lifts a stand of tubing (or rods) which is then held in place by slips (or elevators for rods) while the stand is separated from the remaining portion of the tubing or rod string in the well. Once the stand of tubing has been separated from that which is still in the well, the stand of tubing can be placed on a tubing board, rack, or leaned up against the rig in some form or fashion. The process is substantially in the reverse for the insertion of tubing. During a lifting (pulling out of the hole or "POH") or lowering (running in the hole or "RIH") operation, the weight or load on the hook or block (typically referred to as a "hookload") can fluctuate greatly based on the weight of the tubing string in the well, the conditions within the well, the condition of the tubing string, and the amount of acceleration of the tubing string. The hookload can increase very quickly to a level that is above the safe operating level of the rig. While alarms can be employed, if the operator cannot act quickly enough, the rig may be damaged and workers around the well could be injured.

In addition, as the stands of tubing are being pulled out of the well, the total hookload on the string is reduced. Conversely, as stands of tubing are added to the current tubing string and inserted into the well, the total hookload increases. In each case, while a single hookload limit might be effective during certain portions of the run, as the ratio of the hookload limit to the total hookload on the block changes, its effectiveness at protecting the rig operator, platform workers and the rig itself can be reduced.

Furthermore, as the hookload fluctuates during POH or RIH activities, so too does the overall weight of the rig (generally referred to herein as "measured weight" for the rig). The measured weight is typically a combination of the weight of the rig itself, the hookload and the weight of any tubing that is being stored on the rack or leaning against the rig. Typically drilling and well service rigs have weight limits under which they should be operated. As an RIH or POH activity is conducted, the measured weight for the rig can fluctuate and the limits for the measured weight for the rig during operation (referred to herein as "measured weight limit" or "MWL") may need to be adjusted throughout the activity.

SUMMARY OF THE INVENTION

The present invention is directed to controlling the operation of a well service rig based on rig load data. By removing the need for or limiting the capabilities of the operator during situations of increased load on the well service rig the ability to prevent damage to the service rig and injury to the workers around the well head can be improved.

For one aspect of the present invention, a method for controlling hookload on a well service rig can start by accepting a first hookload limit. The service rig can conduct one of many cycles for an activity at a well and can accept hookload data and the first cycle is being conducted. Each hookload data value that is accepted can be compared to the first hookload limit and, if the value is greater than the first hookload limit, can stop the first cycle of the activity from being completed. A first average hookload can be determined and a computer system can calculate a second hookload limit based on the first average hookload and an overpull value. The service rig can conduct a second cycle of the activity at the well and can collect a second set of hookload data values. The second set of hookload data values can then be compared to the second hookload limit.

For another aspect of the present invention, a method for controlling hookload for a device can start by conducting a first cycle of an activity at a well. During the first cycle, a first set of load-based data values can be accepted by a computer system. The computer system can determine a hookload limit for the device based on the first set of load-based data values. A second cycle of the activity can be run at the device and a second set of load-based data can be accepted during the second cycle. The second set of load-based data can then be compared to the hookload limit.

For yet another aspect of the present invention, a method for controlling hookload on a rig can start by accepting a first hookload limit at a computer system. The rig can conduct one of many cycles for an activity at a well and can accept multiple rig weight data points and measured weight data points as the first cycle is being conducted. The computer system can then determine a multitude of hookload data values by calculating the difference of measured weight data to rig weight data. The hookload data values can be compared to the first hookload limit. The first average rig weight and the first average measured weight can then be determined by the computer system based on the plurality of rig weight data points and the plurality of measured weight data points respectively. A first average hookload can then be determined by calculating the difference of the first average measured weight and the first average rig weight at the computer system. An overpull value can then be determined by calculating the difference of the first hookload limit and the first average hookload. The computer system can calculate the second hookload limit based on the first average hookload and the overpull value. The rig can conduct a second cycle of the activity at the well and can collect a second set of hookload data values. At least a portion of the second set of hookload data values can then be compared to the second hookload limit.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

BRIEF DESCRIPTION OF DRAWINGS

For a more complete understanding of the exemplary embodiments of the present invention and the advantages thereof, reference is now made to the following description in conjunction with the accompanying drawings in which.

DETAILED DESCRIPTION OF THE EXEMPLARY EMBODIMENTS

Exemplary embodiments of the invention will now be described in detail with reference to the included figures. The exemplary embodiments are described in reference to how they might be implemented. In the interest of clarity, not all features of an actual implementation are described herein. Those of ordinary skill in the art will appreciate that in the development of an actual embodiment, several implementation-specific decisions must be made to achieve specific goals, such as compliance with system-related and business-related constraints, which can vary from one implementation to another. Moreover, it will be appreciated that such a development effort might be complex and time-consuming, but would nevertheless be a routine undertaking for those of ordinary skill in the art having benefit of this disclosure. Further aspects and advantages of the various exemplary embodiments will become apparent from consideration of the following description and review of the figures.

Further, one or more aspects of the exemplary embodiments may include a computer program and/or computer system that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. The functionality of the exemplary embodiments will be explained in more detail in the following description, read in conjunction with the figures illustrating the program flow.

Figure 1:
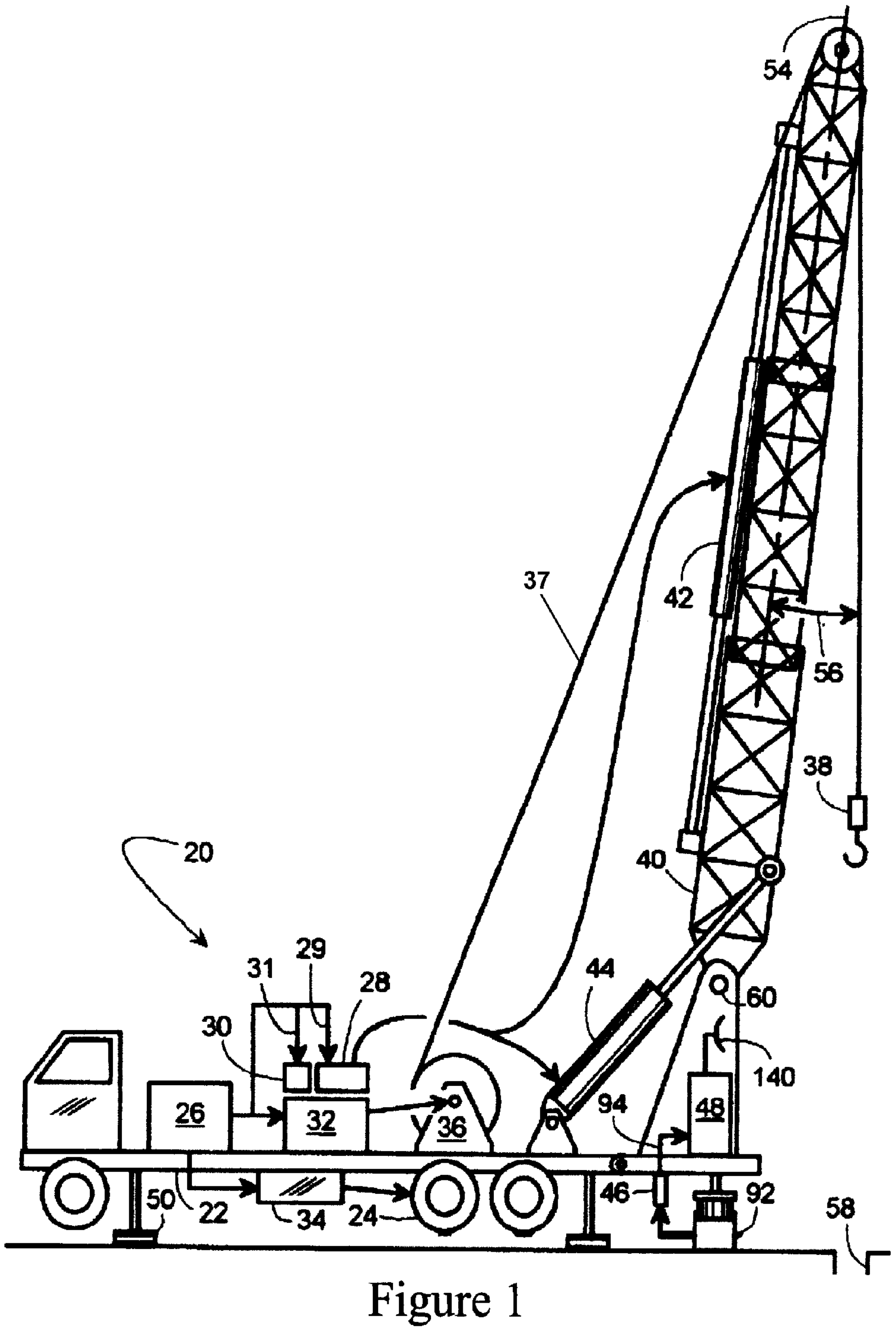
FIG. 1 is a side view of an exemplary well service rig with its derrick extended according to one exemplary embodiment.
Figure 5:
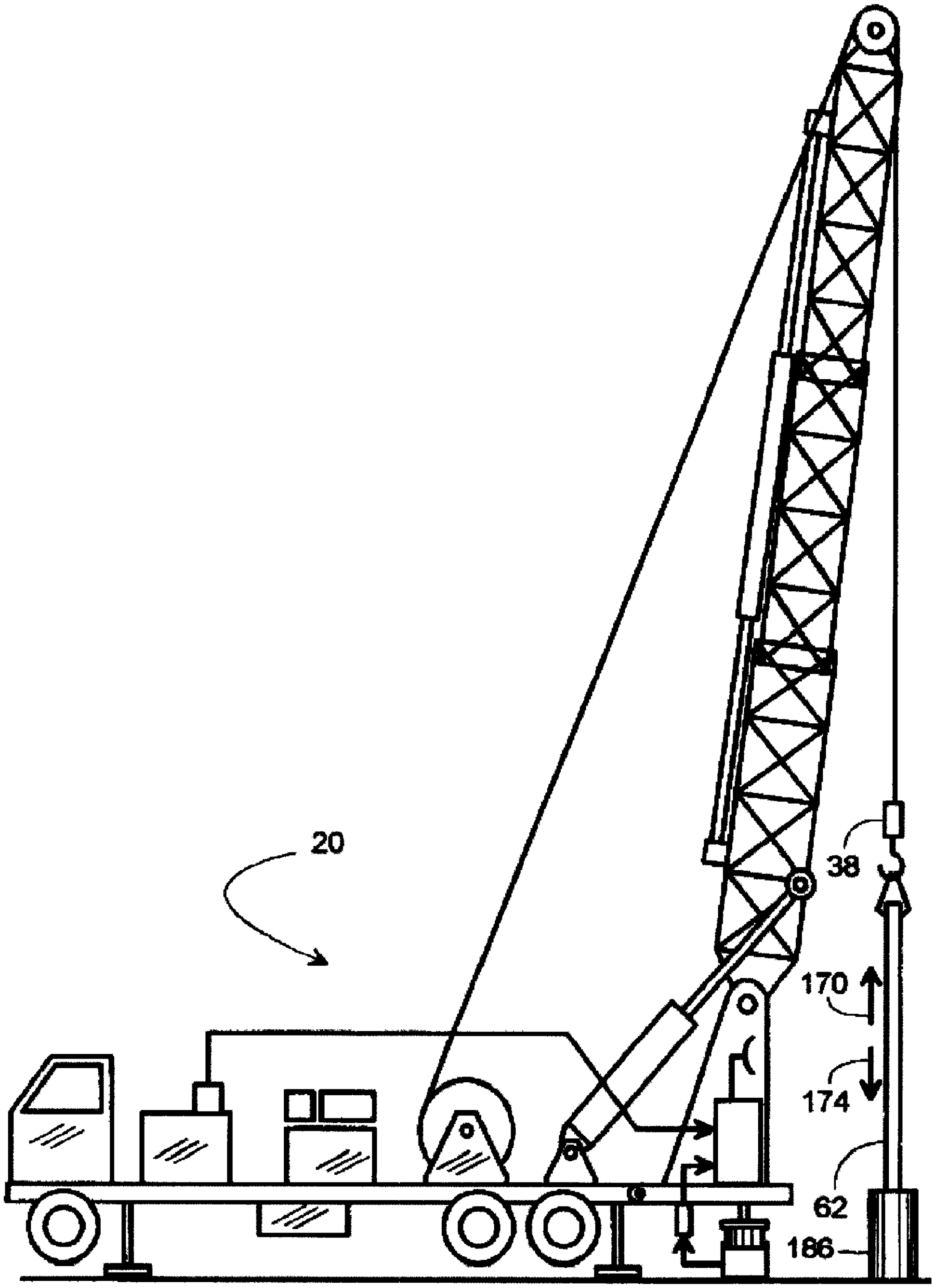
FIG. 5 illustrates the raising and lowering of a tubing string with a well service rig according to one exemplary embodiment.

Referring to FIGS. 1 and 5, a retractable, self-contained well service rig 20 is shown. While the exemplary embodiments and methods throughout this disclosure will be described with reference to the rig 20, the methods and operations described herein should not be so limited and are capable of also being incorporated and used with stationary well-service equipment as well as drilling rigs. The exemplary well service rig 20 includes a truck frame 22 supported on wheels 24, an engine 26, a hydraulic pump 28, an air compressor 30, a first transmission 32, a second transmission 34, a variable speed hoist with a drum 36, a hook line 37, a block 38 coupled to the hook line 37, an extendible derrick 40, a first hydraulic cylinder 42, a second hydraulic cylinder 44, a first transducer 46, a computer system 48, retractable feet 50 and weight pads 92.

Figure 2:
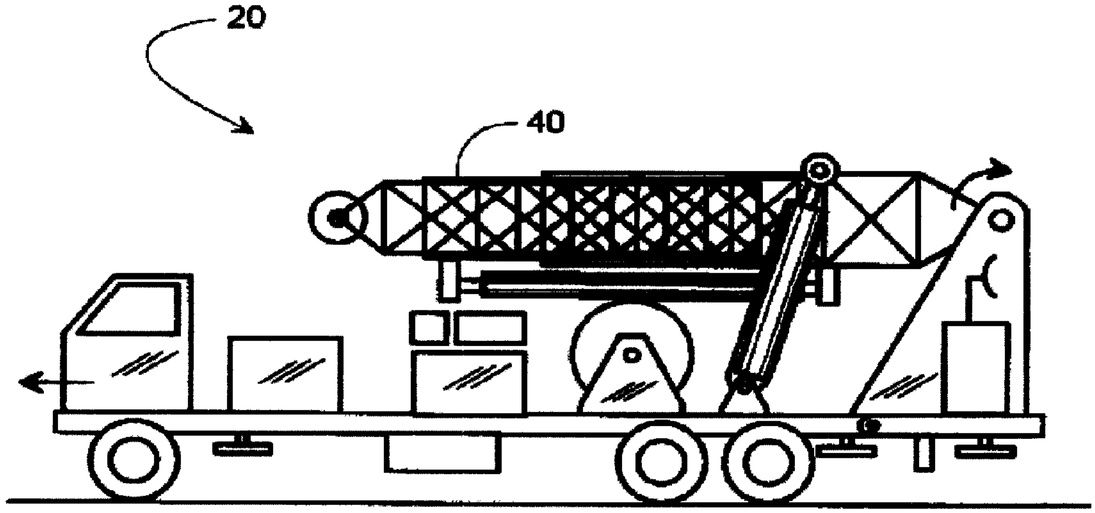
FIG. 2 is a side view of the exemplary well service rig with its derrick retracted according to one exemplary embodiment.

The engine 26 selectively couples to the wheels 24 and the hoist and drum 36 by way of the transmissions 34 and 32 respectively. The engine 26 also drives the hydraulic pump 28 via the line 29 and the air compressor 30 via the line 31. The compressor 30 powers a pneumatic slip (not shown), and pump powers a set of hydraulic tongs (not shown) and the weight pads 92. The pump 28 also powers the cylinders 42 and 44 which respectively extend and pivot the derrick 40 to selectively place the derrick 40 in a working position, as shown in FIG. 1, and in a lowered position, as shown in FIG. 2. In the working position, the derrick 40 is pointed upward and in certain exemplary operational positions, its longitudinal centerline 54 is angularly offset from vertical as indicated by the angle 56. The angular offset provides the block 38 access to a wellbore 58 without interference with the derrick pivot point 60. With the angular offset 56, the derrick frame-work does not interfere with the typically rapid insertion and removal of numerous tubing segments.

Individual tubing segments (of string 62) are screwed to themselves using hydraulic tongs. The term "hydraulic tongs" used herein and below refers to any hydraulic tool that can screw together two sections of any one or more of the types of tubing. In operation, the pump 28 drives a hydraulic motor (not shown) which turns a wrench element relative to a clamp on the tongs. The element and clamp engage flats on the mating couplings of tubing string 62 of one exemplary embodiment.

While not explicitly shown in the figures, when installing the tubing segments 62, the pneumatic slip is used to hold the tubing 62 while the next segment of tubing 62 is screwed on using tongs. A compressor 30 provides pressurized air through a valve to rapidly clamp and release the slip. A tank helps maintain a constant air pressure. Pressure switch provides the computer system 48 (FIG. 3) with a signal that indirectly indicates that rig 20 is in operation.

Figure 3:
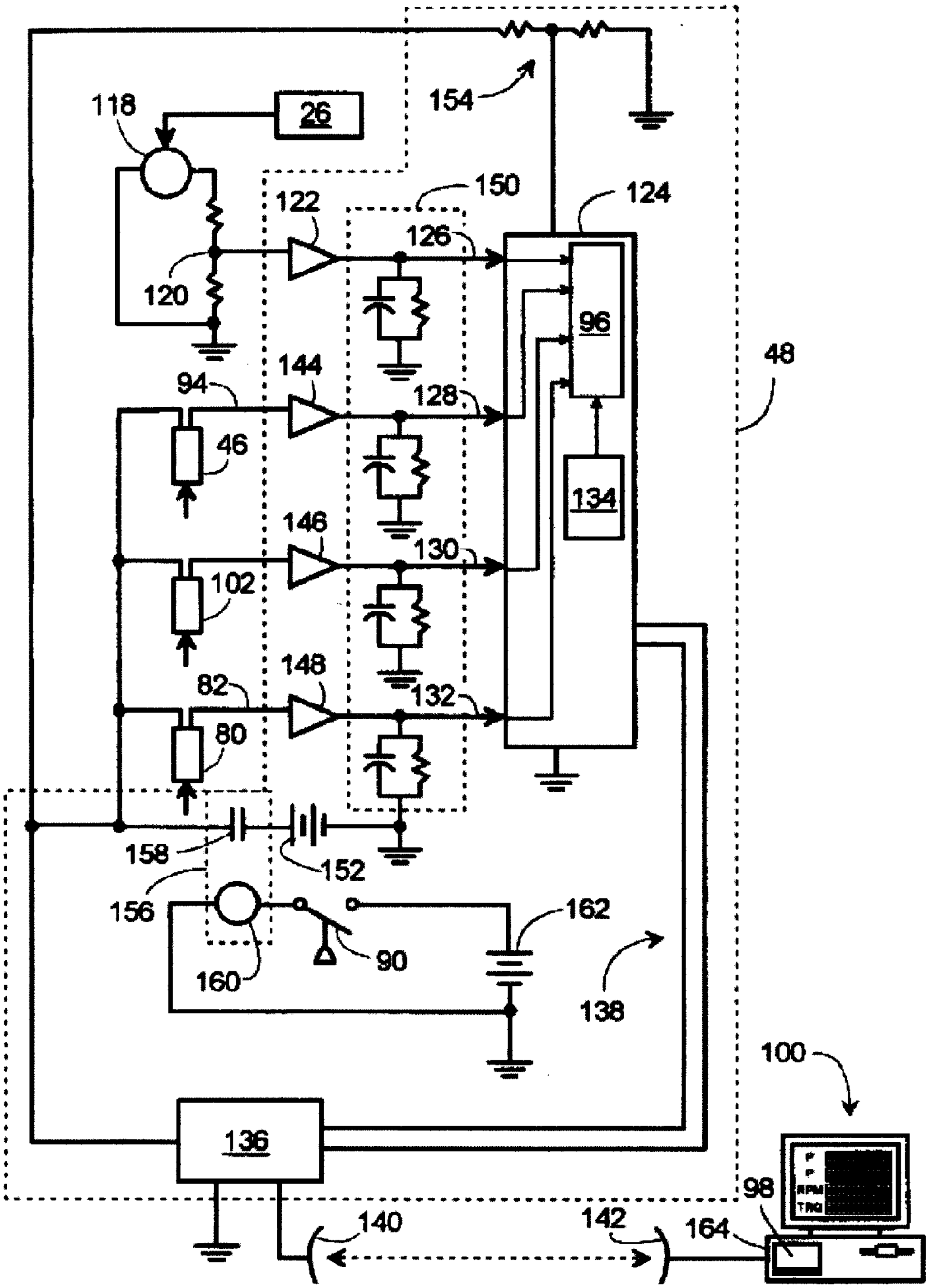
FIG. 3 is an electrical schematic of a monitor circuit according to one exemplary embodiment.

Referring back to FIG. 1, weight applied to the block 38 is sensed by way of a hydraulic pad 92 that supports the weight of the rig 20. The hydraulic pad 92 is basically a piston within a cylinder (or alternatively a diaphragm). Hydraulic pressure in the pad 92 increases with increasing weight on the block 38 or on the rig 20. In FIG. 3, the first transducer 46 converts the hydraulic pressure to a 0-5 VDC signal 94 that is conveyed to the computer system 48. Alternatively, the first transducer 46 can convert the hydraulic pressure into a 4-20 milliamp signal. The computer system 48 converts signal 94 to a digital value (such as a weight value), stores it in memory 96, and associates it with a real time stamp. In certain exemplary embodiments, the computer system 48 also communicates the data to a remote computer 100 or the user interface 700, of FIG. 7, by way of hardwire, a modem 98, T1 line, WiFi, wide area network (WAN), local area network (LAN), wireless local area network (WLAN), metropolitan area network (MAN), satellite, radio frequency (RF), microwave, the Internet, or other device or method for transferring data known to those of ordinary skill in the art.

Figure 4:
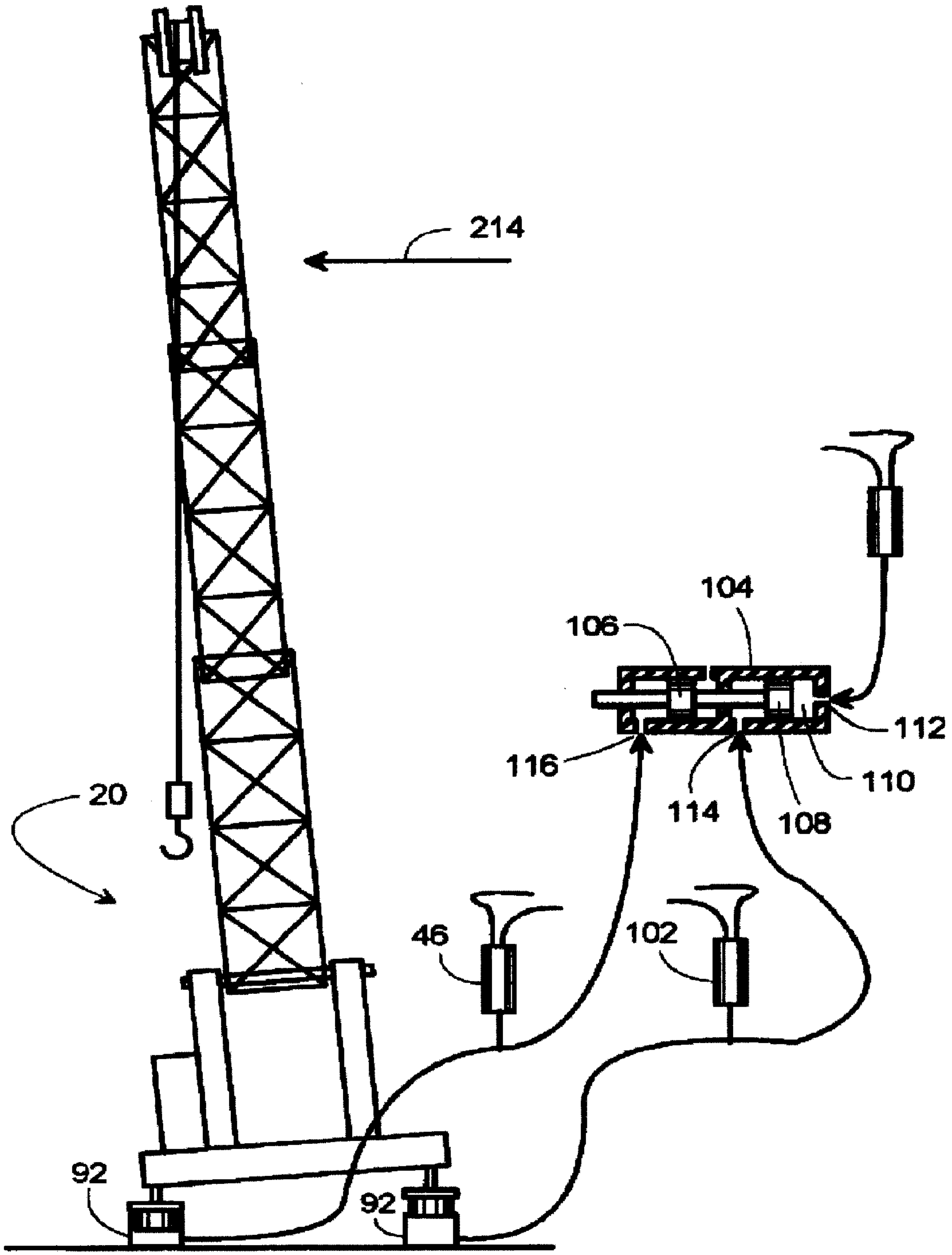
FIG. 4 is an exemplary end view of the derrick of the well service rig on weight pads according to one exemplary embodiment.

In the embodiment of FIG. 4, two pads 92 associated with two transducers 46 and 102 are used. While the exemplary embodiment of FIG. 4 describes the use of two hydraulic pads 92, one or more than two hydraulic pads can be used and are within the scope and spirit of this disclosure. An integrator 104 separates the pads 92 hydraulically. The rod side of the pistons 106 and 108 each have a pressure exposed area that is half the full face area of the piston 108. Thus, the chamber 110 develops a pressure that is an average of the pressures in the pads 92. In one exemplary embodiment, just one transducer 46 is used and it is connected to the port 112. In another exemplary embodiment, two transducers 46 and 102 are used, with the transducer 102 on the right side of the rig 20 coupled to the port 114 and the transducer 46 on the left side coupled to the port 116. While the foregoing has described the use of a hydraulic pad 92 to determine rig weight, measured weight and hookload data, those of ordinary skill in the art will recognize that other types of load gauges can be used, including, but not limited to, strain gauges, line indicators and the like.

Returning to FIG. 3, transducers 46 and 102 are shown coupled to the computer system 48. The transducer 46 indicates the pressure on the left pad 92 and the transducer 102 indicates the pressure on the right pad 92. A generator 118 driven by the engine 26 provides an output voltage proportional to the engine speed. This output voltage is applied across a dual-resistor voltage divider to provide a 0-5 VDC signal at point 120 and then passes through an amplifier 122. A generator 118 represents just one of many various tachometers that provide a feedback signal proportional to the engine speed. Another example of a tachometer would be to have engine 26 drive an alternator and measure its frequency. The transducer 80 provides a signal proportional to the pressure of hydraulic pump 28, and thus proportional to the torque of the tongs.

A circuit 124 includes four input channels 126, 128, 130 and 132 a memory 96 and a clock 134. The circuit 124 periodically samples inputs 126, 128, 130 and 132 at a user selectable or predetermined and preprogrammed sampling rate; digitizes the readings; converts the digitized values based on conversion factors (if necessary) and stores the digitized values and/or converted values in the memory 96. It should be appreciated by those skilled in the art that with the appropriate circuit, any number of inputs can be sampled and the data could be transmitted, converted and analyzed instantaneously upon receipt.

In certain exemplary embodiments a computer 100 remote from the work site at which the service rig 20 is operating can access the data stored in the circuit 124 by way of a data transfer device 136, which may include, but is not limited to, a PC-based modem 98, a wireless device, a satellite-based signal, a cellular phone, a hard-wire feed or other known methods for data transfer. The data transfer device 136 reads the data stored in the circuit 124 via the lines 138 and transmits the data, for example, by way of antennas 140 and 142. In an alternative embodiment the data is transmitted by way of a cable modem, WiFi system, microwave, RF, satellite or other know transmission means.

The amplifiers 122, 144, 146 and 148 condition their respective input signals to provide corresponding inputs 126, 128, 130 and 132 having an appropriate power and amplitude range. Sufficient power is needed for RC circuits 150 which briefly (e.g., 2-10 seconds) sustain the amplitude of inputs 126, 128, 130 and 132 even after the outputs from transducers 46, 102 and 80 and the output of the generator 118 drop off. This ensures the capturing of brief spikes without having to sample and store an excessive amount of data. A DC power supply 152 provides a clean and precise excitation voltage to the transducers 46, 102 and 80; and also supplies the circuit 124 with an appropriate voltage by way of a voltage divider 154. A pressure switch 90 enables the power supply 152 by way of the relay 156, whose contacts 158 are closed by the coil 160 being energized by the battery 162.

Figure 6:
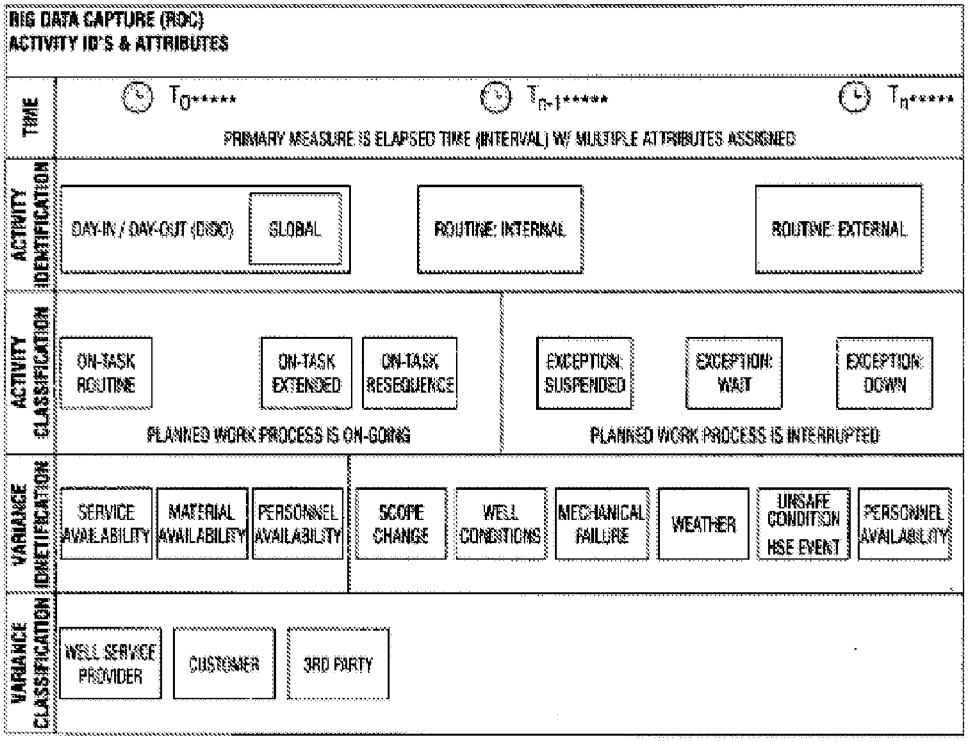
FIG. 6 illustrates one embodiment of an activity capture methodology outlined in tabular form according to one exemplary embodiment.

FIG. 6 provides an illustration of an activity capture methodology in tabular form according to one exemplary embodiment of the present invention. Now referring to FIG. 6, an operator first chooses an activity identifier for his/her upcoming task. If "GLOBAL" is chosen, then the operator would choose from rig up/down, pull/run tubing or rods, or laydown/pickup tubing and rods (options not shown in FIG. 6). If "ROUTINE: INTERNAL" is selected, then the operator would choose from rigging up or rigging down an auxiliary service unit, longstroke, cut paraffin, nipple up/down a BOP, fishing, jarring, swabbing, flowback, drilling, clean out, well control activities such as killing the well or circulating fluid, unseating pumps, set/release tubing anchor, set/release packer, and pick up/laydown drill collars and/or other tools. Finally, if "ROUTINE: EXTERNAL" is chosen, the operator would then select an activity that is being performed by a third party, such as rigging up/down third party servicing equipment, well stimulation, cementing, logging, perforating, or inspecting the well, and other common third party servicing tasks. After the activity is identified, it is classified. For all classifications other than "ON TASK: ROUTINE," a variance identifier is selected, and then classified using the variance classification values. Selections for each of the activities presented above can be made by a rig operator, for example, on the user interface 700 provided in FIG. 7. The selection can then be transmitted to the computer system 48 for storage in memory or for use in determining other values, standards and limits for controlling the operation of the rig 20.

Figure 7:
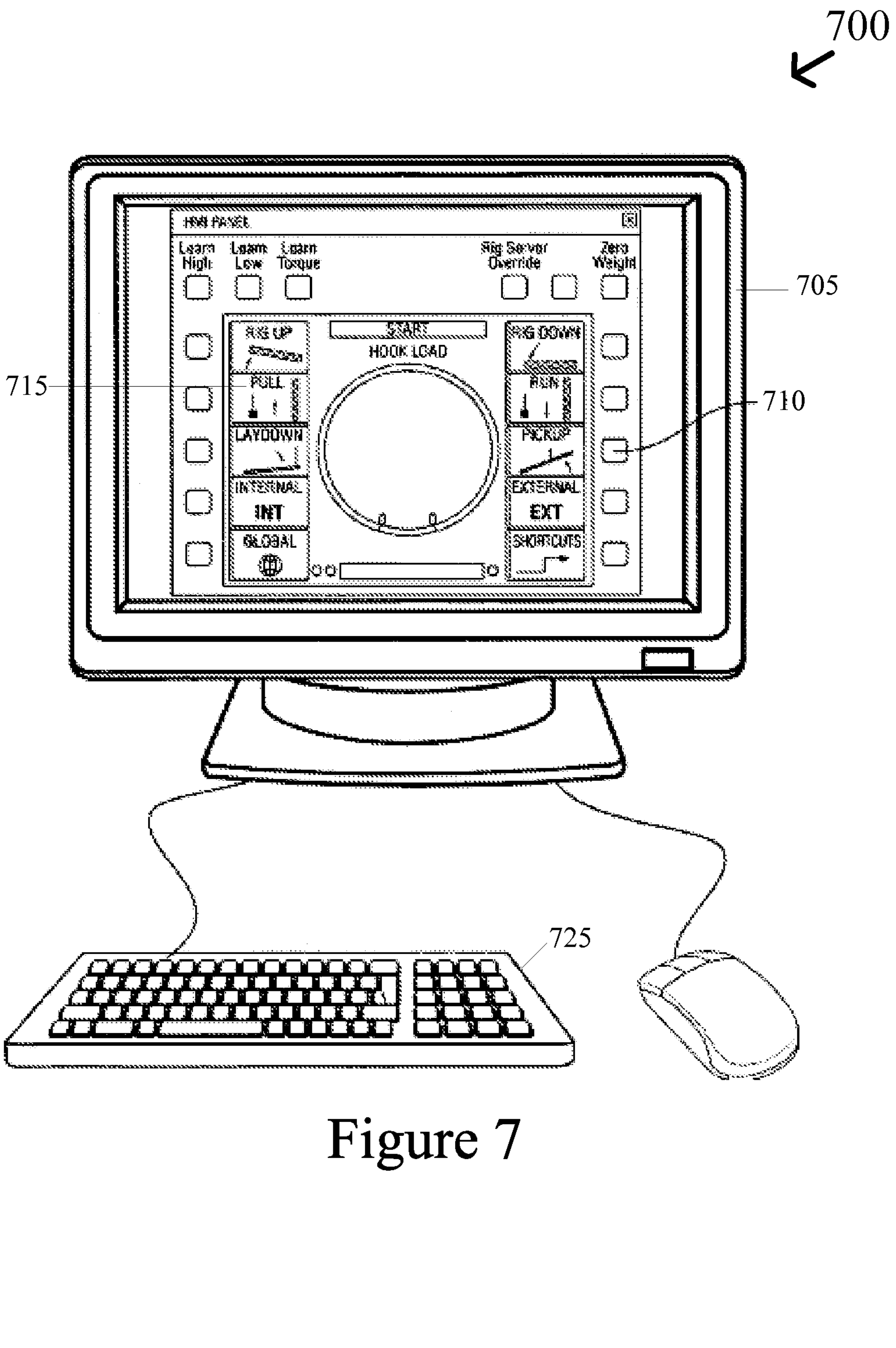
FIG. 7 provides a frontal view of an exemplary user interface for rig operators according to one exemplary embodiment.

FIG. 7 provides a view of a rig operator user interface 700 according to one exemplary embodiment. Now referring to FIG. 7, the user interface 700 includes a frame 705 and a screen 710. In one exemplary embodiment, the screen is a touch-screen that allows the operator to input information related to the rig 20 for use by the computer system 48. For example, as shown in FIG. 7, the screen 710 can provide a listing of activities 715 than can be completed by the rig 20 and the operator can select one of the activities 715, by either touching the activity on the screen or using more standard input devices, such as a mouse and or keyboard 725 to select the activity. For instance, if the operator were presented with the display of FIG. 7 upon arriving at the well site, the operator would first press the "RIG UP" button. The operator would then be presented with the option to select, for example, "SERVICE UNIT," "AUXILIARY SERVICE UNIT," or "THIRD PARTY." The operator then would select whether the activity was on task, or if there was an exception, as described above. In addition, as shown in FIG. 7, prior to pulling (removing) or running (inserting) tubing, the operator could set the high and low limits for the block 38 by pressing the learn high or learn low buttons after moving the block 38 into the proper position. The operator could also input initial standards or limits for use by the automated hookload limiting system.

Processes of exemplary embodiments of the present invention will now be discussed with reference to FIGS. 8-13. Certain steps in the processes described below must naturally precede others for the exemplary embodiment to function as described. However, the process is not limited to the order of the steps described if such order or sequence does not alter the functionality or overall result of the process in an undesirable manner. That is, it is recognized that some steps may be performed before or after other steps or in parallel with other steps without departing from the scope and spirit of the present invention.

Figure 8:
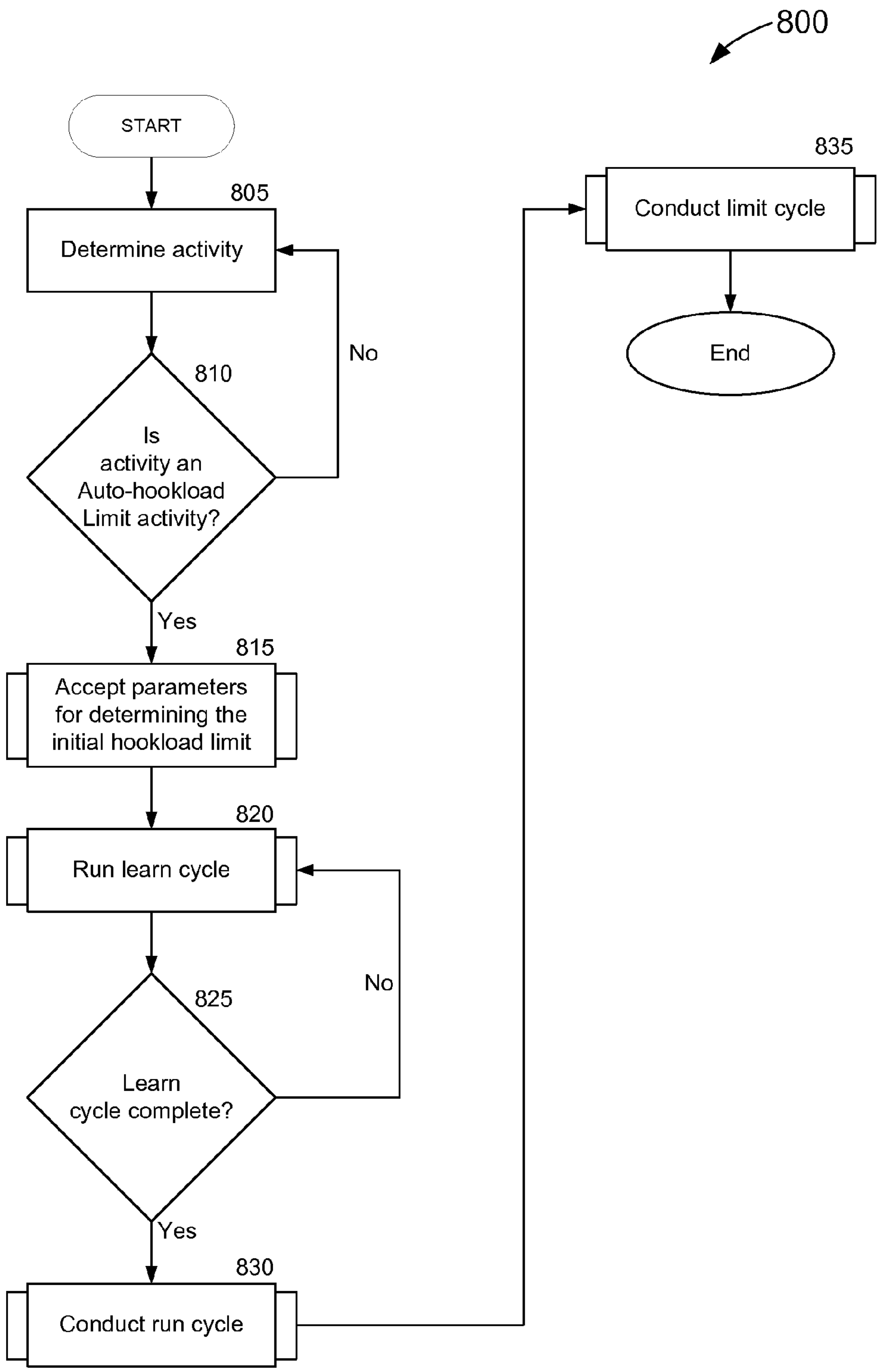
FIG. 8 is a flowchart of an exemplary process for automatically setting and resetting the hookload limits and controlling rig operations with regard to hookload and rig weight limits according to one exemplary embodiment.

Turning now to FIG. 8, a logical flowchart diagram illustrating an exemplary method 800 for automatically setting and resetting hookload and other limits and controlling rig operations with regard to hookload and other rig weight limits is presented according to one exemplary embodiment of the present invention. Referring now to FIGS. 1, 3-7 and 8, the exemplary method 800 begins at the START step and continues to step 805 where the activity being conducted at the rig 20 is determined. In one exemplary embodiment, the activity is determined by a rig operator selecting the activity at the rig interface 700. Alternatively, the activity can be automatically determined by the computer system 48 by evaluating certain actions and parameters of the well service rig 20. Exemplary methods for automatically determining rig operations are provided in U.S. Pat. No. 7,519,475, titled Method for Determining Block Properties of a Service Rig by Evaluating Rig Data; U.S. Pat. No. 7,359,801, titled Method and System for Evaluating Weight Data from a Service Rig; and U.S. patent application Ser. No. 11/518,701 titled Method and System for Evaluating Task Completion Times to Data, the entire contents of each of which are incorporated herein by reference.

In step 810, an inquiry is conducted to determine if the activity being conducted at the rig 20 is one for which the automated hookload limiting system should be used. In one exemplary embodiment, the determination is made by the computer system 48. In this exemplary embodiment, the rig operator selects an activity at the user interface 700. The activity request is transmitted to the computer system 48. The computer system 48 compares the activity being or to be conducted to a list of activities for which the automated hookload limiting (AHLL) system should be used. If the activity is one for which the AHLL system should be used, the computer system 48 determines if the selected activity is different from the activity that is currently being conducted or was last conducted. For example, if the rig 20 was previously conducting a POH activity and then was just waiting and then enters another POH activity, this typically would not be considered a new activity. If the activity is new, then computer system 48 sends a request to the user interface 700 for display to the operator requesting the AHLL initial input parameters that are provided by the rig operator.

Alternatively, the computer system 48 can provide a prompt and or accept an input from the operator at the user interface 700 regarding whether to initiate the AHLL system. In certain exemplary embodiments, activities conducted at the rig 20 that use the AHLL system include, but are not limited to, running in the hole, pulling out of the hole, sandline activities, or any other activity that would have predictably varying hook loads (i.e. the next hook load can only vary by a limited amount in a properly functioning system). If a determination is made that the AHLL system should not be used for the current activity, the NO branch is followed back to step 805 to continue monitoring activities. Otherwise, the YES branch is followed to step 815, where the initial parameters for the AHLL operation are accepted. In one exemplary embodiment, the initial parameters are input by the rig operator at the user interface 700. Alternatively, the initial parameters are stored on and retrieved from the memory 96 of the computer system 48. In yet another alternative embodiment, some parameters are stored and received from the computer system 48 while other parameters are input by the rig operator at the user interface 700.

The learn cycle is run in step 820. In one exemplary embodiment, the learn cycle may generally be described as the first few runs of an activity, such as pulling the first few tubing strings 62 out of the hole 58, and is completed to make sure the data is being obtained correctly at, for example, the computer system 48 and that the initial limits are substantially as expected. In one exemplary embodiment, a single run or cycle of an activity includes the movement of the block 38 from an unloaded position, through the operator actions, such as pulling a stand of tubing out of the hole or running a stand of tubing into the hole, and back to an unloaded position. In one example for POH, a run or cycle includes starting from a block position ready to connect to the string 62; connecting the block 38 to the string 62; lifting the string off of the slips; raising the string 62 so a section of tubing can be removed; placing the string 62 back onto the slips; removing the section of tubing and placing it down; and moving the block 38 back to a position ready to reconnect to the string 62. In another example, for RIH, a run or cycle includes starting from a block position ready to connect to a new section of tubing to add to the string 62; picking up a new section of tubing and attaching it to the string 62; lifting the string 62 off of the slips; lowering the string into the wellbore 58 (which may include the act of drilling the wellbore); placing the string 62 back onto the slips; and moving the block 38 back to a position ready to connect to a new section of tubing.

An inquiry is conducted in step 825 to determine if the learn cycle is complete. In one exemplary embodiment, the determination is made by the computer system 48 based on a variety of factors. Alternatively, the rig operator can make the determination and input that determination in the user interface 700. If the learn cycle is not complete, the NO branch is followed back to step 820, where the learn cycle continues. If the learn cycle is complete, the YES branch is followed to step 830. In step 830, the computer system 48 initiates and conducts the run cycle for the particular activity. In one exemplary embodiment, if certain limitations are reached, the process continues to step 835, where the limit cycle is conducted for the particular activity. The process then continues to the END step.

Figure 9:
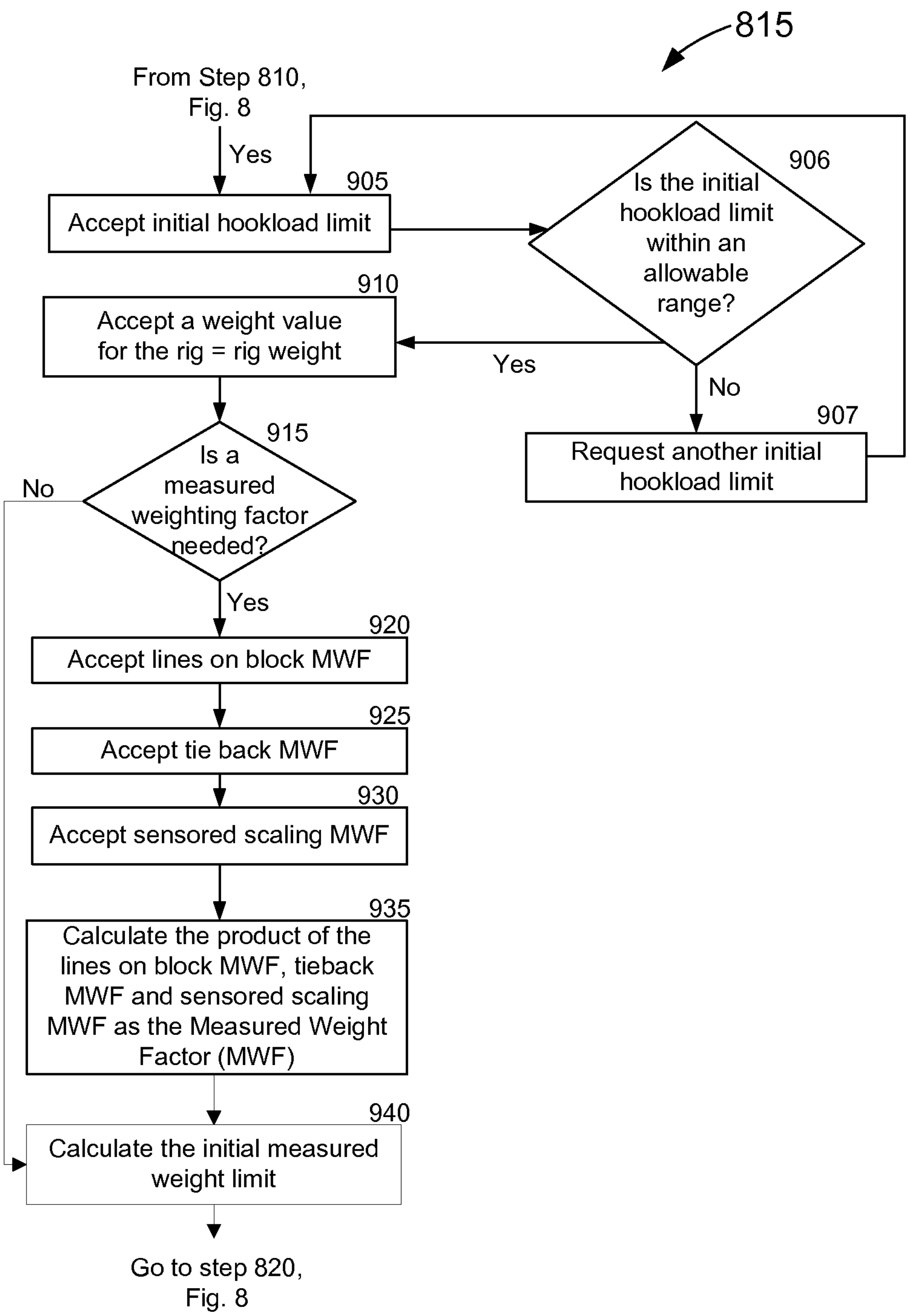
FIG. 9 is a flowchart of an exemplary process for accepting the initial parameters for the automated operation according to one exemplary embodiment.

FIG. 9 presents a logical flowchart diagram illustrating an exemplary method 815 for accepting the initial parameters for the AHLL operation according to the exemplary embodiment of FIG. 8. Referring now to FIGS. 1, 3-8 and 9, the exemplary method 815 begins by accepting the initial hookload limit at step 905. In one exemplary embodiment, the initial hookload limit is entered in by the rig operator at the interface 700. The initial hookload limit is then stored in the memory 96 of the computer system 48. Alternatively, the initial hookload limit is stored and retrieved from the memory 96 of the computer system 48. In yet another alternative embodiment, the initial hookload limit is the current hookload limit from the activity that was previously completed.

An inquiry is conducted in step 906 to determine if the initial hookload limit is within an allowable range. In one exemplary embodiment, the computer system 48 makes the determination by comparing the initial hookload limit to an allowable range made up of the derrick hookload limit on the high side and the minimum hookload limit on the low side. If the initial hookload limit is not within the allowable range, the NO branch is followed to step 907, where the computer system triggers a signal to request another initial hookload limit. In one exemplary embodiment, the request is presented to the operator at the user interface 700. The process returns to step 905 to accept another initial hookload limit. Returning to step 906, if the initial hookload limit is within the allowable range, the YES branch is followed to step 910.

In step 910, the rig weight is accepted. In one exemplary embodiment, the rig weight is determined based on the pressure (hydraulic or otherwise) readings at the pads 92. Those pressure readings are converted to a weight value using a conversion factor that is provided by the hydraulic pad manufacturer. In one exemplary embodiment, the pressure reading is received by the computer system 48, which converts that reading into a weight value. Alternatively, the rig operator can enter the rig weight into the computer system 48 through the user interface 700. In another alternative embodiment, the rig weight is a predetermined value that is stored and retrieved from the memory 96 of the computer system 48. In this exemplary embodiment, the derrick hookload limit (the maximum load limit for the derrick) is set as the initial hookload limit. In yet another alternative embodiment, along with or instead of determining the rig weight, the operator can zero out or calibrate the weight measurement system to remove the rig weight by pressing a zero weight button at the user interface 700.

In step 915, an inquiry is conducted to determine if measured weight factors are needed. In one exemplary embodiment this determination is made by the computer system 48. In an alternative embodiment, the determination is made by the rig operator at the user interface 700. If the measured weight factor is not needed, the NO branch is followed to step 820 of FIG. 8. Otherwise, the YES branch is followed to step 920, where an input is received providing the lines on the block measured weight factor. In one exemplary embodiment, the input is received at the user interface 700 from the rig operator. Alternatively, the lines on block measured weight factor is stored in and retrieved from the memory 96 of the computer system 48.

The tieback measured weight factor is accepted in step 925. In one exemplary embodiment, the tieback measured weight factor is input at the user interface 700. In an alternative embodiment, the tieback measured weight factor is stored in and retrieved from the memory 96 of the computer system 48. In step 930, the sensor scaling weight factor is accepted. The sensor scaling measured weight factor is similar to that which is described above with regard to converting pressure readings at the pads 92 to weight values. Depending on what sensors are being used and what weight is being measured, different measured weight factors will likely be used. In one exemplary embodiment, the sensor scaling measured weight factor is input by the rig operator at the user interface 700. Alternatively, the sensor scaling measured weight factor(s) is stored in and retrieved from the memory 96 of the computer system 48.

The measured weight factor (MWF) is determined in step 935. In one exemplary embodiment, the MWF is determined by the computer system 48. In that exemplary embodiment, the MWF is determined by calculating the product of the lines on block measured weight factor, the tieback measured weight factor and the sensor scaling measured weight factor. In step 940 the initial measured weight limit (MWL) is calculated. In one exemplary embodiment the MWL is determined by the computer system 48 and can be the sum of the rig weight and the initial hookload limit. The process then continues to step 820 of FIG. 8.

Figure 10A:
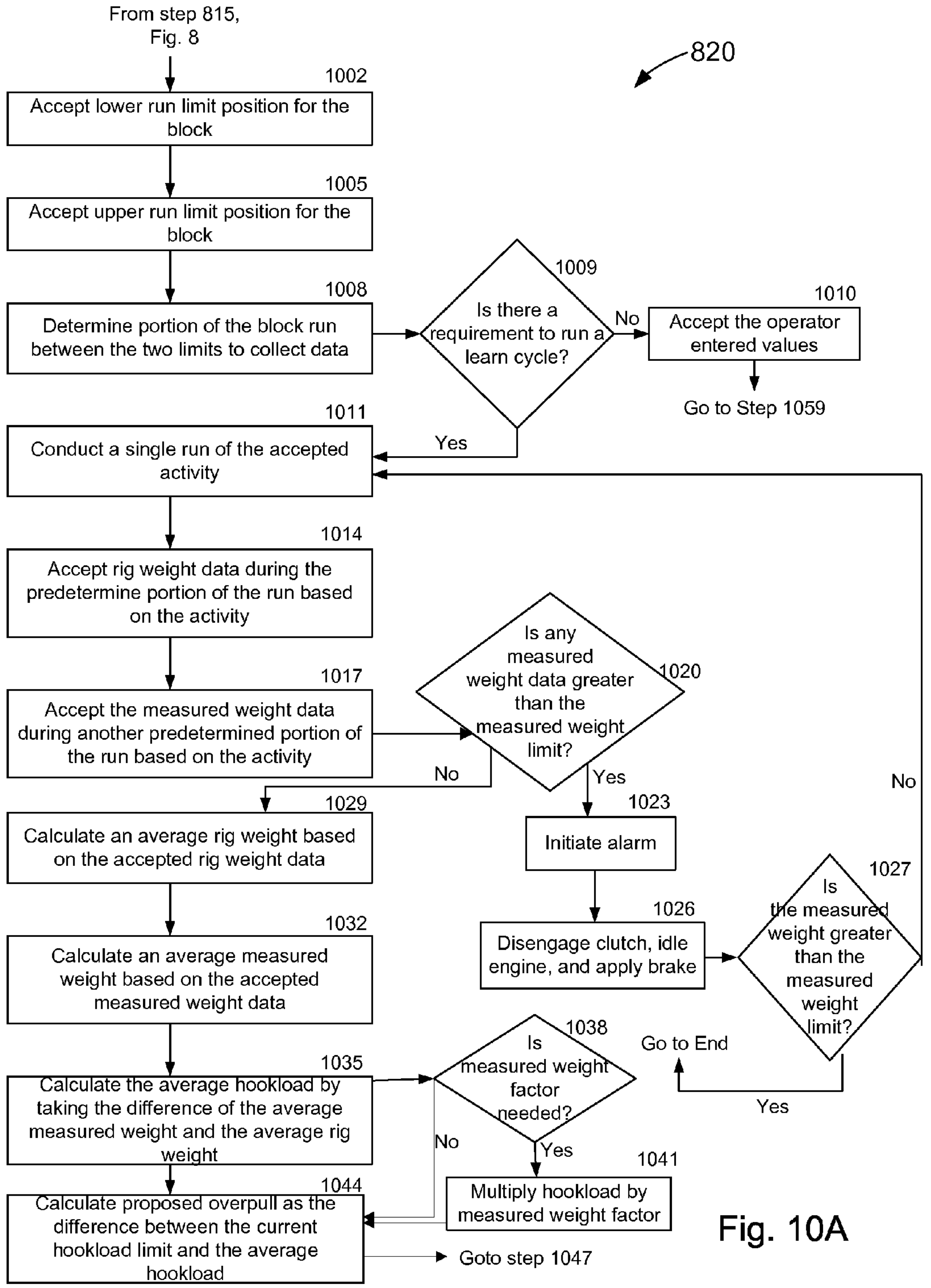
FIGS. 10A and 10B are flowcharts of an exemplary process for completing a learn cycle for the automated hookload limit operation according to one exemplary embodiment.
Figure 10B:
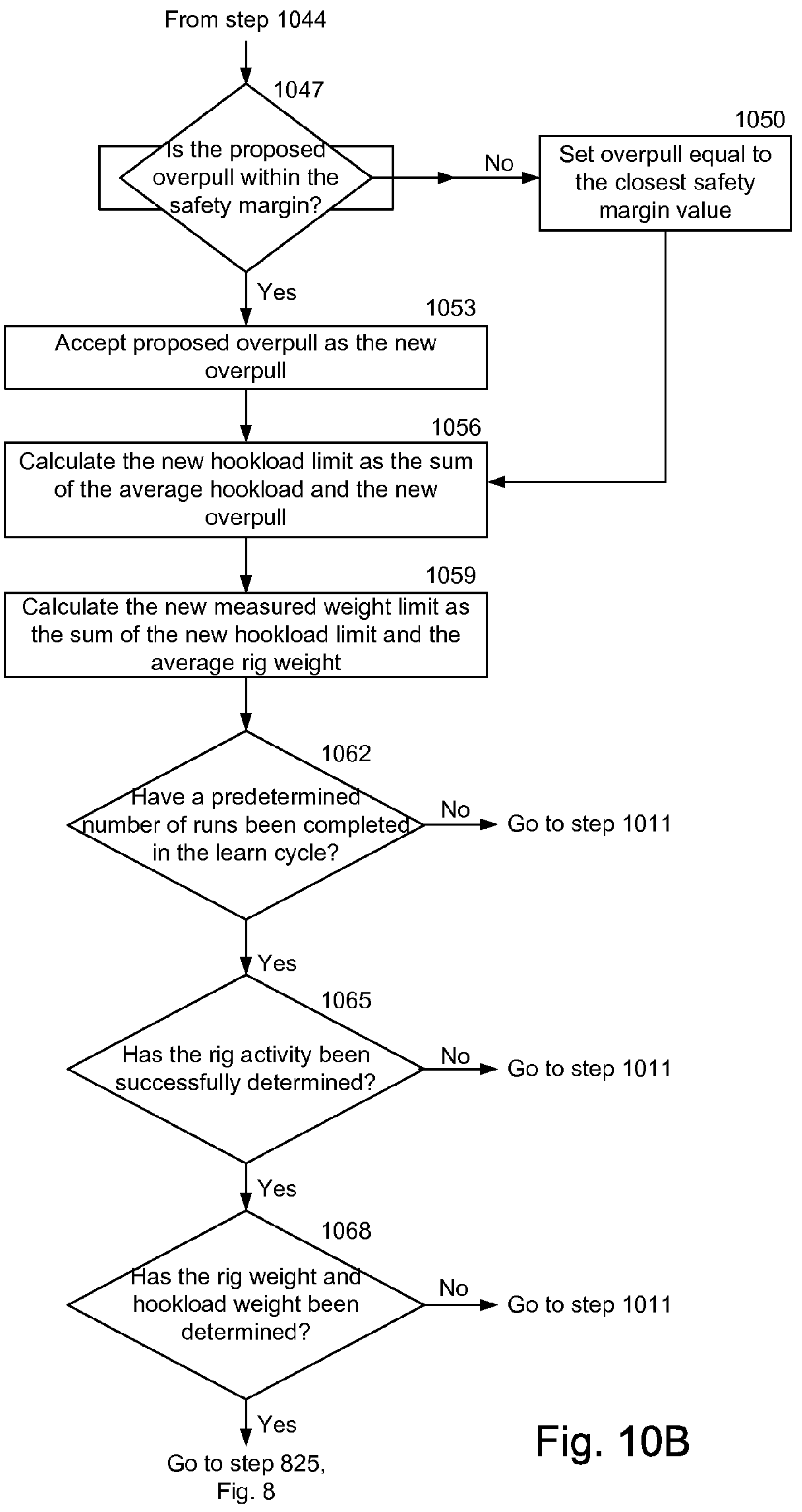

FIGS. 10A and 10B present a logical flowchart diagram illustrating an exemplary method 820 for completing a learn cycle for the automated hookload limit operation according to the exemplary embodiment of FIG. 8. Now referring to FIGS. 1, 3-8 and 10A and 10B, the exemplary method 820 begins at step 1002, where the lower run limit for the block 38 is accepted. In one exemplary embodiment, the operator can provide the lower run limit for the block 38 by lowering the block 38 to the desired lower limit and, once there, entering that position on the user interface 700. In certain exemplary embodiments, the position of the block 38 is monitored using an encoder at the drum 36 or elsewhere along the line 37. In an alternative embodiment, the lower run limit for the block 38 is determined by the computer system 48 evaluating the encoder output for the particular activity and making a determination of the lower limit based on those output values.

The upper run limit for the block 38 is accepted by the system 48 in step 1005. In one exemplary embodiment, the operator can provide the upper run limit for the block 38 in a manner similar to that described above in step 1002, except that the block is first run to the desired upper limit. Also, alternatively, the upper run limit for the block 38 can be determined by the computer system 48 making the determination based on the encoder data obtained during the activity and storing the value in memory 96. In step 1008, the system 48 determines the portion of the block run between the two limits in which the system will collect particular data for calculations. For example, if the hookload is being determined independently of the measured weight and the rig weight, the hookload is determined during an activity when the block 38 is lifting the tubing string 62 and the rig weight will be determined during the portion of the run or cycle when the block 38 is not connected to the tubing string 62 or tubing section. For example, when a RIH activity is being completed, the hookload is determined when the block 38 is lifting the string 62 off of the slips. For a POH activity, the hookload is determined during a portion of the range and the block is lifting the tubing string 62 and before the tubing section is removed from the tubing string. For example, the bottom quarter and top quarter of the lifting of the string can be ignored and the hookload data can be obtained from the middle fifty percent of the lift of the tubing string 62. Those or ordinary skill in the art will recognize that all or other portions of the lift can be used for collecting the hookload data without departing from the scope and spirit of this invention.

In step 1009, an inquiry is conducted to determine if there is a requirement to complete one or more runs of the accepted activity in the learn cycle. In certain embodiments, the system may be configured to not require the operator to complete any runs of an activity in the learn cycle. In one of these exemplary embodiments, the programming as to whether or not runs will need to be made in the learn cycle is stored in the memory 96 of the computer system 48. If there is not a requirement to conduct runs in the learn cycle, the NO branch is followed to step 1010, wherein the operator entered values are accepted. The process then continues to step 1059. Alternatively, if runs are required in the learn cycle, then the YES branch is followed to step 1011.

A single run of the particular activity is conducted in step 1011. For example, a single run for pulling out of the hole could be running the block 38 down and attaching it to the tubing string 62, lifting the tubing string 62 out of the well 58, disconnecting the removed string 62 from the remainder of the tubing string in the well, and storing the tubing string, for example, on the rack or leaning it against the rig 20. The actual rig weight data is accepted at the system 48 during the predetermined portion of the run based on the particular activity in step 1014. In step 1017, the actual measured weight data is accepted at the system 48 during another predetermined portion of the run based on the activity. In certain exemplary embodiments, the period in which the data is accepted for the rig weight and the measured weight are the same or different and may or may not overlap. In one exemplary embodiment, both the actual rig weight and the actual measured weight data are received from the pressure readings at the pads 92 and stored an analyzed by the computer system 48.

An inquiry is conducted in step 1020 to determine if the actual measured weight at any point during the run is greater than the measured weight limit. This will typically occur as the run is going on, such that if there is a problem, the activity will be stopped automatically by the computer system 48, and almost immediately upon detection. In one exemplary embodiment, this measured weight limit is the initial measured weight limit input calculated by the system 48 in FIG. 9. If the actual measured weight is greater than the measured weight limit, the YES branch is followed to step 1023, where a signal is sent by the system 48 to initiate an alarm. The alarm can be audible, visual or a combination of both. For example, the alarm can be a siren, a light, and or a message that is displayed on the user interface 700. In step 1026, the system 48 sends a signal to apply the brake, disengage the drum clutch between the engine 26 and the drum 36, and idle the engine 26 for the rig 20.

In step 1027, an inquiry is conducted to determine if the measured weight is still greater than the MWL. In one exemplary embodiment, a measured weight measurement can be taken after stopping the rig operations in step 1026 and that weight can be analyzed by the computer system 48 to determine if the new measured weight data is still greater than the MWL. If, the measured weight is still greater than the MWL, the YES branch is followed to the END step. Otherwise, the NO branch is followed to step 1011. In certain exemplary embodiments, the operator can acknowledge the alarm, correct the issue, and/or instruct the rig to continue making runs. In this embodiment, the weight data taken during the run in which the alarm condition occurred will not be used for determining the hookload limit, MWL or the proposed overpull.

Returning to step 1020, if the measured weight is not greater than the measured weight limit, then the NO branch is followed to step 1029. In step 1029, a new average rig weight is determined based on the accepted actual rig weight data. In one exemplary embodiment, the determination is made by the computer system 48. In this embodiment, the computer system 48 accepts multiple rig weight data points, sums up the weight values represented by those data points and divides that sum by the number of data points. In one exemplary embodiment, the data values are taken every ten milliseconds during the specified portion of the run; however greater or lesser time periods for taking data values can be used. In an alternative embodiment, one of the actual rig weight data points is used instead of an average of the actual rig weight data points. In step 1032, a new average measured weight is determined based on the accepted actual measured weight data. In one exemplary embodiment, the determination is made by the computer system 48. In this embodiment, the computer system 48 accepts multiple measured weight data points, sums up the measured weight values represented by those data points and divides that sum by the number of data points. In one exemplary embodiment, the data values are taken every ten milliseconds during the specified portion of the run; however greater or lesser time periods for taking data values can be used. In an alternative embodiment, one of the actual measured weight data points is used instead of an average of the actual measured weight data points.

The new average hookload is determined in step 1035. In one exemplary embodiment, the determination is made by the computer system 48. In one exemplary embodiment, the new average hookload is determined by calculating the difference between the new average measured weight and the new average rig weight. Alternatively, the new average hookload is determined by accepting hookload data during the run using either a measuring device on the line 37, such as a line scale, or based on the rig operator setting a zero weight for the rig at the interface 700 prior to beginning the activity or the particular run and calculating the new average hookload in a manner similar to that described in steps 1029 and 1032. In an alternative embodiment, one of the actual hookload data points is used instead of an average of the hookload data points.

An inquiry is conducted in step 1038 to determine if the measured weight factor is needed. In one exemplary embodiment, this determination is made by the computer system 48. If the MWF is needed, the YES branch is followed to step 1041, where the system 48 calculates the product of the new average hookload and the MWF as the new average hookload. The process then continues to step 1044. If the MWF is not needed, the NO branch is followed to step 1044. In step 1044, a new proposed overpull is determined. In one exemplary embodiment, the new proposed overpull is determined by the computer system 48. Further, in one exemplary embodiment, the new proposed overpull is calculated as the difference between the current hookload limit and the new average hookload. In another exemplary embodiment, the proposed overpull can be the average of the proposed overpulls taken over the learn cycle runs. For example, if three runs are completed during the learn cycle, then the proposed overpull for each run is summed together, and that sum is divided by three to arrive at the proposed overpull. In this exemplary embodiment, the analysis and determination are completed by the computer system 48.

In step 1047, an inquiry is conducted to determine if the new proposed overpull is within the safety margin. In one exemplary embodiment, the safety margins are a range of weight. The safety margins can be input by the operator at the user interface 700, for example, during the accepting of parameters phase of step 815 and stored in the memory 96 of the system 48. Alternatively, the safety margins can be pre-stored in the memory 96 of the computer system 48. The safety margins can be the same or different for each particular activity. If the new proposed overpull is not within the safety margin, the NO branch is followed to step 1050, where the system 48 sets the new overpull as equal to the closest safety margin. For example, if the new proposed overpull was 18,000 pounds and the safety margin is a range of 5,000-15,000 pounds, then the new proposed overpull would be outside of the safety margin and the new overpull would be adjusted to 15,000 pounds. In another example, if the new proposed overpull was 3,000 pounds and the safety margin is the same range as above, then the new overpull would be adjusted to 5,000 pounds. Returning to step 1047, if the new proposed overpull is within the safety margin, then the YES branch is followed to step 1053, where the new proposed overpull is accepted as the new overpull.

In step 1056, the new hookload limit is calculated. In one exemplary embodiment, the computer system 48 calculates the new hookload limit. Further, in one exemplary embodiment, the new hookload limit is calculated as the sum of the new average hookload and the new overpull. In an alternative embodiment where a single hookload data point is used instead of an average of the hookload data points or the difference between the average rig weight and the average measured weight, then the new hookload limit would be the sum of the hookload data point weight value and the new overpull. The new measured weight limit is calculated in step 1059. In one exemplary embodiment, the new measured weight limit is determined by the computer system 48. In addition, in one exemplary embodiment, the new measured weight limit is calculated as the sum of the new hookload limit and the new average rig weight.

In step 1062, an inquiry is conducted to determine if the predetermined number of runs have been completed in the learn cycle. In certain exemplary embodiments, the number of runs that are completed before exiting the learn cycle are between 1 and 1000 and preferably three runs. In one exemplary embodiment, the computer system 48 has a counter register that counts the number of runs for the activity that have been completed in the learn cycle. If the predetermined number of runs have not been completed, the NO branch is followed, the new hookload limit is set at the current hookload limit, the new MWL is set as the current MWL and the process returns to step 1011 to complete another run. On the other hand, if the predetermined number of runs has been completed, the YES branch is followed to step 1065.

An inquiry is conducted in step 1065 to determine if the rig activity has been successfully determined by the computer system 48 using any of the methods that have been described above. If the rig activity has not been successfully determined, then the NO branch is followed, the new hookload limit is set at the current hookload limit, the new MWL is set as the current MWL and the process returns to step 1011 to complete another run. Otherwise the YES branch is followed to step 1068. In step 1068, an inquiry is conducted to determine if the average rig weight and the average hookload have been determined. In certain exemplary embodiments, the determination of step 1068 is made by the computer system 48. Alternatively, the determination can be made by the operator and entered on the user interface 700 and communicated to the computer system. If the average rig weight and average hookload have not been determined, then the NO branch is followed, the new hookload limit, if available, is set at the current hookload limit, the new MWL, if available, is set as the current MWL and the process returns to step 1011 to complete another run. Otherwise, the YES branch is followed to step 825 of FIG. 8.

Figure 11:
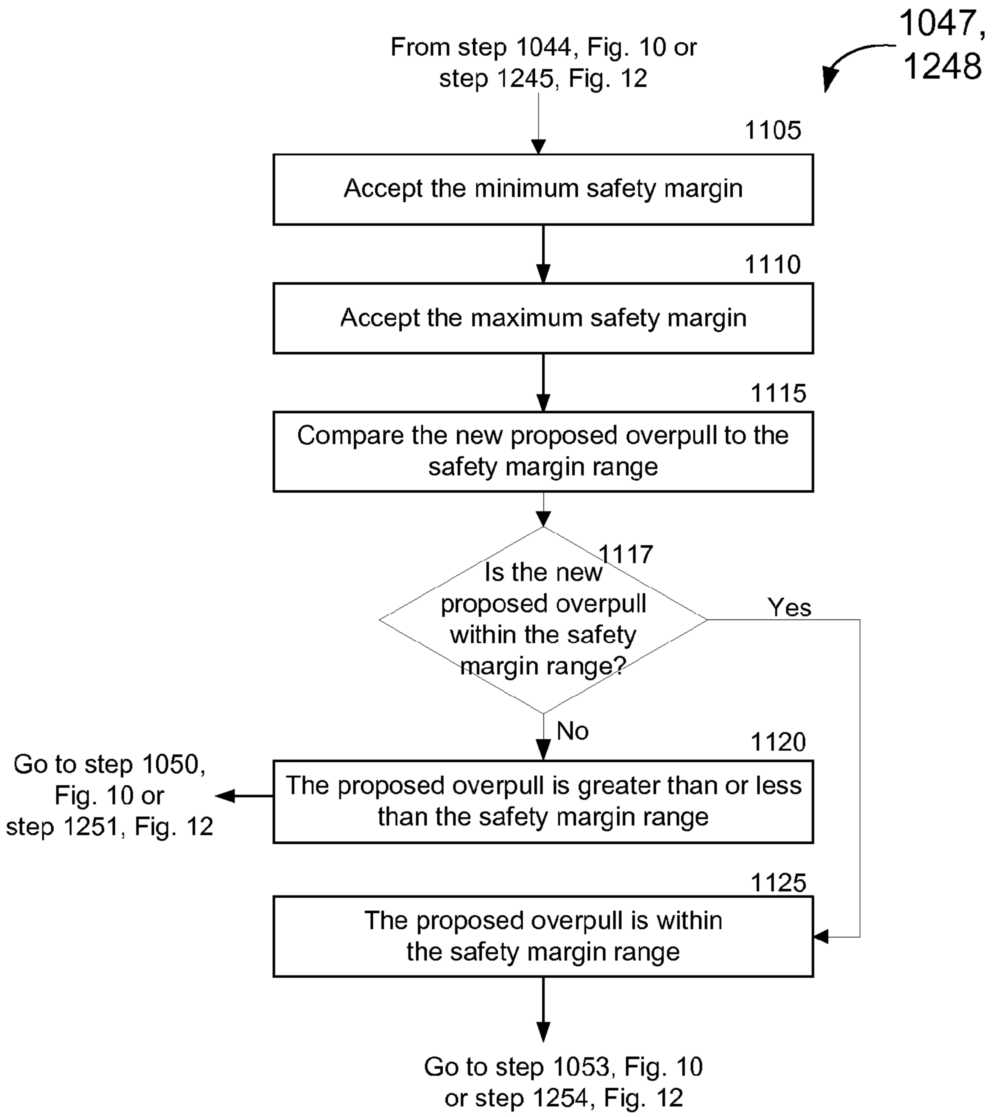
FIG. 11 is a flowchart of an exemplary process for determining if a proposed overpull is within the safety margin for the automated hookload limit operation according to one exemplary embodiment.

FIG. 11 presents a logical flowchart diagram illustrating an exemplary method 1047 for determining if a new proposed overpull is within the safety margin according to the exemplary embodiment of FIGS. 10A and 10B. Referring now to FIGS. 1, 3-7, 10A, 10B, and 11, the exemplary method 1047 begins at step 1105, where the minimum safety margin is accepted. In one exemplary embodiment, the minimum safety margin is entered into the computer system by the rig operator at the user interface 700 and transmitted to the computer system 48. For example, this step could be completed when the operator is entering in other parameters in step 815 of FIG. 8. Alternatively, the minimum safety margin is stored in memory 96 of the computer system 48 and retrieved as necessary. In step 1110, the maximum safety margin is accepted. As with the minimum safety margin, the maximum safety margin can be input by the operator at the user interface 700 or stored and retrieved from the memory 96 of the computer system 48 when needed, in accordance with certain exemplary embodiments. In one exemplary embodiment, the minimum safety margin is 5,000 pounds and the maximum safety margin is 15,000 pounds; however, those of ordinary skill in the art will recognize that the minimum and maximum safety margins could be anywhere within a range of one pound to 200,000 pounds.

In step 1115, the new proposed overpull is compared to the safety margin range. In one exemplary embodiment, the comparison is completed by the computer system 48. In step 1117, an inquiry is conducted to determine if the new proposed overpull is within the safety margin. If the new proposed overpull is not within the safety margin, then the NO branch is followed to step 1120, where the determination is that the new proposed overpull is greater than or less than the safety margin range. The process then continues to step 1050 of FIG. 10B. Returning to step 1117, if the new proposed overpull is within the safety margin range, the YES branch is followed to step 1125, where the determination is that it is within the safety margin. The process continues to step 1053 of FIG. 10B.

Figure 12A:
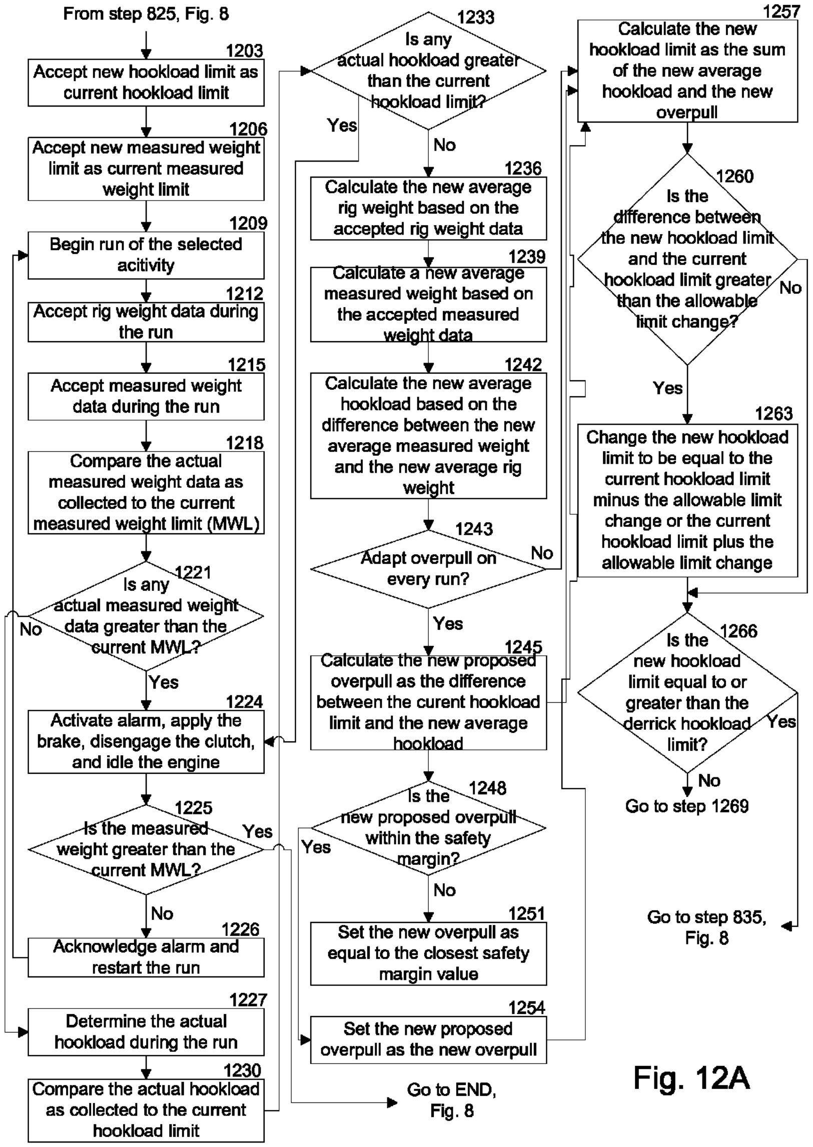
FIGS. 12A and 12B are flowcharts of an exemplary process for completing a run cycle for an activity using the automated hookload limit operation according to one exemplary embodiment.
Figure 12B:
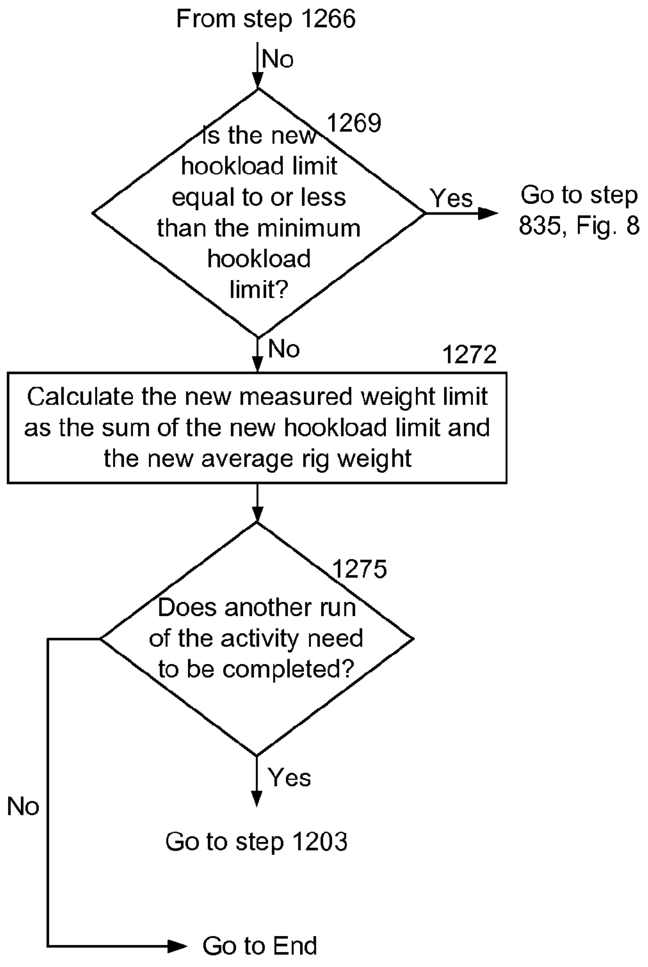

FIGS. 12A and 12B present a logical flowchart diagram illustrating an exemplary method 830 for completing a run cycle for an activity using the AHLL operation according to the exemplary embodiment of FIG. 8. Referring now to FIGS. 1, 3-8, and 12A and 12B, the exemplary method 830 begins at step 1203, where the new hookload limit is accepted as the current hookload limit at the computer system 48. In step 1206, the new measured weight limit is accepted as the current measured weight limit at the computer system 48. In each of steps 1203 and 1206, the computer system 48 can retrieve the stored values from the most recent run that were calculated as the new hookload limit and the new MWL and use those as the limits for the next ensuing run of the activity. In step 1209 the next run or cycle of the activity begins at the well service rig 20.

The actual rig weight data is accepted during the run in step 1212 and is substantially similar to that which is described with regard to the learn cycle in FIGS. 10A and 10B. In certain exemplary embodiments, the actual weight data is determined by the computer system 48 from the hydraulic pressure readings received at the pads 92 and are collected during certain portions of the run depending on the activity being completed. In step 1215, the actual measured weight data is accepted. In certain exemplary embodiments, the actual measured weight data is determined by the computer system 48 from the hydraulic pressure readings received at the pads 92 and those readings are collected during other portions of the run depending on the activity being completed.

The actual measured weight data as it is being collected is compared to the MWL in step 1218. In certain exemplary embodiments this comparison is conducted by the computer system 48. In step 1221, an inquiry is conducted to determine if any of the actual measured weight data is greater than the MWL. This inquiry can be conducted by the computer system 48. If the any of the actual measured weight data is greater than the MWL, the YES branch is followed to step 1224, where the computer system 48 sends signals to activate an alarm, apply the drum brake, disengage the drum clutch and idle the engine 26. As discussed above, the alarm can be audible, visual or a combination of both. For example, the alarm can be a siren, a light, and or a message that is displayed on the user interface 700. The fact that an alarm is activated can also be stored in the memory 96 of the computer system 48 for later analysis and teaching purposes.

In step 1225, an inquiry is conducted to determine if the measured weight is still greater than the MWL. In one exemplary embodiment, a measured weight measurement can be taken after stopping the rig operations in step 1224 and that weight can be analyzed by the computer system 48 to determine if the new measured weight data is still greater than the MWL. If, the measured weight is still greater than the MWL, the YES branch is followed to the END step. Otherwise, the NO branch is followed to step 1226, where the operator can acknowledge the alarm, correct the issue, and/or instruct the rig to continue making runs. In this embodiment, the weight data taken during the run in which the alarm condition occurred will not be used for determining the new hookload limit, new MWL or the new proposed overpull. The process then continues from step 1226 to step 1209 to begin the next run.

Returning to step 1221, if none of the actual measured weight data is greater than the MWL, the NO branch is followed to step 1227, where the actual hookload data is determined or accepted during the run. In one exemplary embodiment, the actual hookload data is accepted at or determined by the computer system 48. For example, the actual hookload data can be generated by the computer system 48 calculating the difference between the actual measured weight data and the rig weight data. Alternatively, the actual hookload data can be collected data during the run using either a measuring device on the line 37, such as a line scale, or based on the rig operator setting a zero weight for the rig 20 at the interface 700 prior to beginning the activity or the particular run and then using that change in value as the actual hookload data as determined by the hydraulic pressure at the pads 92.

The actual hookload data as it is being collected is compared to the current hookload limit in step 1230. In certain exemplary embodiments this comparison is conducted by the computer system 48 in real or substantially real-time. In step 1233, an inquiry is conducted to determine if any of the actual hookload data is greater than the current hookload limit. This inquiry can be conducted by the computer system 48 in certain exemplary embodiments. If any of the actual hookload data is greater than the current hookload limit, the YES branch is followed to step 1224, where the computer system 48 sends signals to activate an alarm, apply the drum brake, disengage the drum clutch and idle the engine 26. On the other hand, if none of the actual hookload data is greater than the current hookload limit, the NO branch is followed to step 1236, where the new average rig weight is determined based on the actually rig weight data. In one exemplary embodiment, the determination is made by the computer system 48. In this embodiment, the computer system 48 accepts multiple rig weight data points, sums up the weight values represented by those data points and divides that sum by the number of data points. In one exemplary embodiment, the data values are taken every ten milliseconds during the specified portion of the run; however greater or lesser time periods for taking data values can be used.

In step 1239, a new average measured weight is determined based on the actual measured weight data for the run. In one exemplary embodiment, the determination is made by the computer system 48. In this embodiment, the computer system 48 accepts multiple measured weight data points during the run, sums up the measured weight values represented by those data points and divides that sum by the number of data points. In one exemplary embodiment, the data values are taken every ten milliseconds during the specified portion of the run; however greater or lesser time periods for taking data values can be used.

The new average hookload is determined in step 1242. In one exemplary embodiment, the determination is made by the computer system 48 and is determined by calculating the difference between the new average measured weight and the new average rig weight. Alternatively, the new average hookload is determined by accepting hookload data during the run using either a measuring device on the line 37, such as a line scale, or based on the rig operator setting a zero weight for the rig at the interface 700 prior to beginning the activity or the particular run and calculating the new average hookload in a manner similar to that described in steps 1236 and 1239.

An inquiry is conducted in step 1243 to determine if the overpull will be adapted after every run. In certain exemplary embodiments, the overpull will be set in the learn cycle and then not modified in the run cycle. In other exemplary embodiments, the overpull can be recalculated after every run during the run cycle, along with the other parameters that are reset after each run. If the overpull will not be adapted on every run, the NO branch is followed to step 1257. Otherwise, the YES branch is followed to step 1245.

In step 1245, a new proposed overpull is determined. In one exemplary embodiment, the new proposed overpull is determined by the computer system 48 and is calculated as the difference between the current hookload limit and the new average hookload. In step 1248, an inquiry is conducted to determine if the new proposed overpull is within the safety margin. If the new proposed overpull is not within the safety margin, the NO branch is followed to step 1251, where the system 48 sets the new overpull as equal to the closest safety margin. If the new proposed overpull is within the safety margin, then the YES branch is followed to step 1254, where the new proposed overpull is accepted as the new overpull.

In step 1257, the new hookload limit is calculated. In one exemplary embodiment, the computer system 48 calculates the new hookload limit. Further, in one exemplary embodiment, the new hookload limit is calculated as the sum of the new average hookload and the new overpull. In step 1260, an inquiry is conducted to determine if the difference between the new hookload limit and the current hookload limit is greater than the allowable limit change. In one exemplary embodiment, the determination is made by the computer system 48. Further, the allowable limit change can be input by the operator at the user interface 700 and sent to the computer system to be stored in memory 96 at any time, including during the parameters input process of step 815 of FIG. 8, or the allowable limit change can be a preset value stored in the memory 96 of the computer system 48 according to certain exemplary embodiments. The allowable limit change can also be the same or different for each of the activities for which AHLL is conducted. In one exemplary embodiment, the allowable limit change is one thousand pounds; however that value is configurable and modifiable in the computer system 48 such that greater or lesser weight limits can be used. If the difference is greater than the allowable limit change, then the YES branch is followed to step 1263, where the new hookload limit is changed to be equal to the current hookload limit minus the allowable limit change or the current hookload limit plus the allowable limit change, depending on the activity. The process continues to step 1266. Returning to step 1260, if the difference is not greater than the allowable limit change, then the NO branch is followed to step 1266.

In step 1266, an inquiry is conducted to determine if the new hookload limit is greater than the derrick hookload limit. In one exemplary embodiment, the determination is made by the computer system 48. Further, the derrick hookload limit can be input by the operator at the user interface 700 and sent to the computer system 48 to be stored in memory 96 at any time, including during the parameters input process of step 815 of FIG. 8, or the derrick hookload limit can be a preset value stored in the memory 96 of the computer system 48 according to certain exemplary embodiments. The derrick hookload limit is typically the same, irrespective of the type of activity for which AHLL is conducted. In one exemplary embodiment, the derrick hookload limit is determined based on the type of rig 20 and derrick 40 being used.

If the new hookload limit is greater than the derrick hookload limit, the YES branch is followed to step 835 of FIG. 8. Otherwise, the NO branch is followed to step 1269. In step 1269, an inquiry is conducted to determine if the new hookload limit is less than the minimum hookload limit. In one exemplary embodiment, the determination is made by the computer system 48. Further, the minimum hookload limit can be input by the operator at the user interface 700 and sent to the computer system 48 to be stored in memory 96 at any time, including during the parameters input process of step 815 of FIG. 8, or the minimum hookload limit can be a preset value stored in the memory 96 of the computer system 48 according to certain exemplary embodiments. The minimum hookload limit is typically the same irrespective of the type of activity for which AHLL is conducted.

If the new hookload limit is less than the minimum hookload limit, the YES branch is followed to step 835 of FIG. 8. If the hookload limit is not less than the minimum hookload limit, then the NO branch is followed to step 1272, where the computer system 48 calculates the new measured weight limit. In one exemplary embodiment, the new measured weight limit is calculated as the sum of the new hookload limit and the new average rig weight. In step 1275, an inquiry is conducted to determine if there is another run of the activity to be completed. If there is another run of the activity to be completed, then the YES branch is followed to step 1203. Otherwise, the no branch is followed to the END step in FIG. 8.

Figure 13:
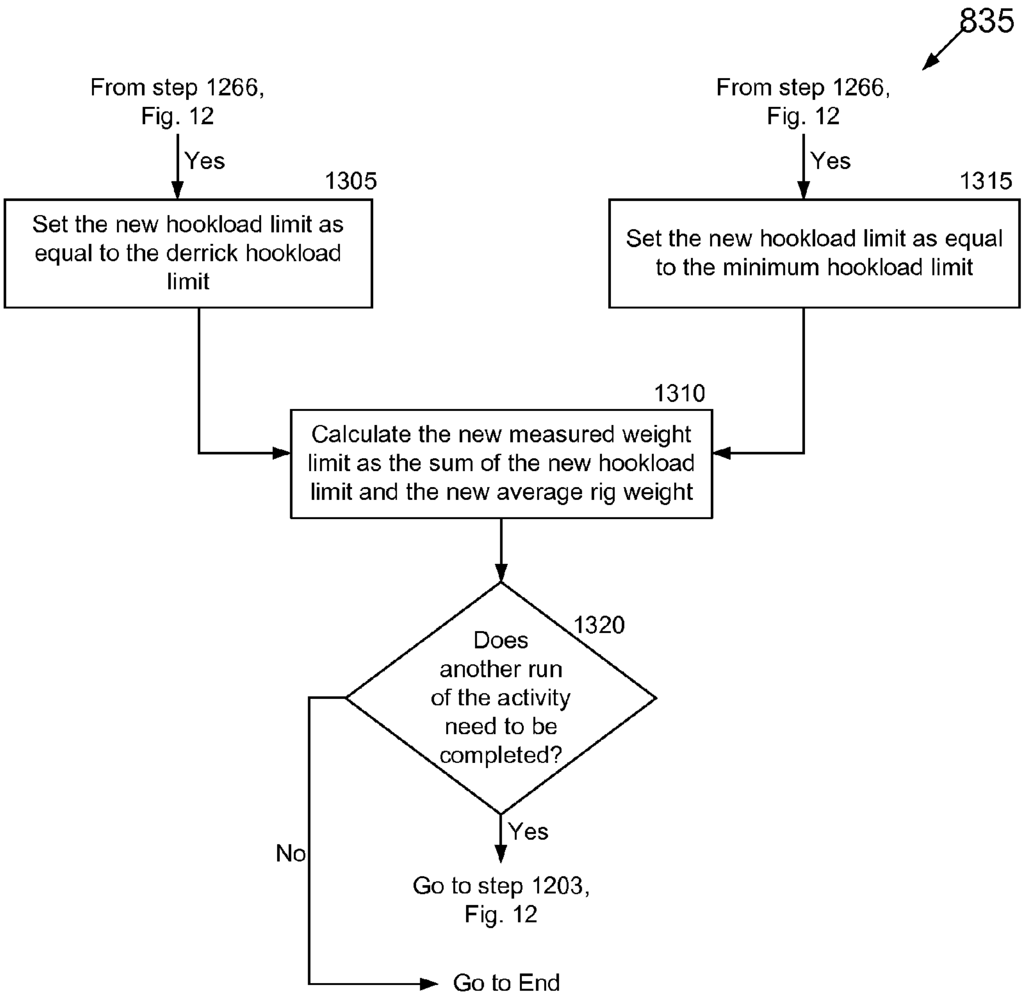
FIG. 13 is a flowchart of an exemplary process for conducting a limit cycle during an activity using the automated hookload limit operation according to one exemplary embodiment.

FIG. 13 presents a logical flowchart diagram illustrating an exemplary method 835 for conducting a limit cycle during an activity using the AHLL operation according to the exemplary embodiment of FIG. 8. Referring now to FIGS. 1, 3-8, 12A, 12B, and 13, the exemplary method 835 begins at step 1305, where the computer system 48 sets the new hookload limit as being equal to the derrick hookload limit. The process then continues to step 1310. In step 1315, the computer system 48 sets the new hookload limit as equal to the minimum hookload limit.

In step 1310, the new measured weight limit is calculated. In certain exemplary embodiments, the MWL is calculated by the computer system 48 and is the sum of the new hookload limit and the new average rig weight. In step 1320, an inquiry is conducted to determine if there is another run of the activity to be completed. If there is another run of the activity to be completed, then the YES branch is followed to step 1203 of FIG. 12A. Otherwise, the NO branch is followed to the END step in FIG. 8.

For each of the above-described exemplary embodiments for which the computer system 48 is discussed, those of ordinary skill in the art will recognize that in alternative embodiments, the computer system 48 can be replaced with a laptop computer either tethered to the rig 20 or separate and/or remote from the rig 20, a handheld computing device, a programmable logic controller, or any other device that has logic and memory module functionality. In certain exemplary embodiments, the computer system 48 is a KEYVIEW satellite-enabled rig data capture system.

During each of the methods described above and during any point in any of the activities and processes, the learn cycle can be restarted by the operator performing particular actions, including, but not limited to, selecting the "zero weight" button on the user interface 700, changing the weight method (i.e. modifying any of the measured weight factors), or selecting a new initial hookload limit. In addition, during each of the processes described above and during any point in any of those activities and processes, certain events can cause the rig 20 to re-enter the learn cycle including, but not limited to, an automated detection (for example by the computer system 48) of an activity change, activation of internal or external alarms, or sensor failures. For each of these, the computer system 48 can detect the issue and can either continue normal operation or return to the learn cycle.

While the exemplary embodiments are described in reference to a mobile well service rig, those of ordinary skill in the art will recognize that the methods may also be employed on any device that has cyclical lifting and lowering operations including, but not limited to, a stationary well service rig, a general service derrick and a drilling rig. Furthermore, in those methods described above, where one value is compared to another value to determine if one is greater than or less than the other, in alternative embodiments, the comparison may be modified to determined if one value is greater than or equal to or less than or equal to the other value instead. Similarly, in those methods described above, where one value is compared to another value to determine if the first is greater than or equal to or less than or equal to the second value, in alternative embodiments, the comparison may be modified to determine if the first value is greater than or less than the second value.

Although the invention is described with reference to preferred embodiments, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those of ordinary skill in the art, and ways of constructing other embodiments of the present invention will suggest themselves to practitioners of the art. Therefore, the scope of the present invention is to be limited only by any claims that follow.

We claim:

1. A method for controlling hookload on a well service rig comprising the steps of:

accepting a first hookload limit at the computer system;

conducting a first cycle of an activity at a well;

accepting hookload data during the first cycle of the activity;

with the computer system, comparing each hookload data value to the first hookload limit;

stopping the first cycle of the activity if at least one of the hookload data values is greater than the first hookload limit;

determining with the computer system a first average hookload;

calculating with the computer system a second hookload limit based on the first average hookload and an overpull value;

conducting a second cycle of the activity at the well;

accepting a second set of hookload data during the second cycle; and comparing at least a portion of the hookload data values in the second set of hookload data to the second hookload limit.

2. The method of claim 1, wherein the second hookload limit is a sum of the first average hookload and the overpull value.

3. The method of claim 1, further comprising the steps of:

accepting a first measured weight limit at the computer system;

accepting measured weight data during the first cycle of the activity, wherein the measured weight is a sum of the rig weight and a hook load on the well service rig;

with the computer system comparing each measured weight data value to the first measured weight limit; and calculating with the computer system a second measured weight limit.

4. The method of claim 3, further comprising the step of stopping the first cycle of the activity if at least one of the measured weight data values is greater than the first measured weight limit.

5. The method of claim 3, further comprising the steps of:

accepting rig weight data during the first cycle of the activity;

determining with the computer system a first average rig weight; and wherein the second measured weight limit is the sum of the second hookload limit and the first average rig weight.

6. The method of claim 1, further comprising the steps of:

accepting rig weight data during the first cycle of the activity;

determining with the computer system a first average measured weight;

determining with the computer system a first average rig weight; and determining with the computer system the first average hookload based on the first average rig weight and the first average measured weight.

7. The method of claim 6, wherein the first average hookload is the difference of the first average measured weight and the first average rig weight.

8. The method of claim 1, further comprising the steps of:

calculating with the computer system a proposed overpull based on the first hookload limit and the first average hookload; and wherein the proposed overpull is calculated as the difference between the first hookload limit and the first average hookload.

9. The method of claim 8, further comprising the steps of:

determining with the computer system if the proposed overpull is within a safety margin range; and setting the proposed overpull as the overpull value based on a positive determination that the proposed overpull is within a safety margin range.

10. The method of claim 8, further comprising the steps of:

determining with the computer system if the proposed overpull is within a safety margin range; and setting the overpull value as equal to an outer boundary of the safety margin range based on a negative determination that the proposed overpull is with a safety margin range.

11. The method of claim 1, further comprising the step of determining with the computer system if a difference between the first hookload limit and the second hookload limit exceeds an allowable change.

12. The method of claim 11, further comprising the step of adjusting the second hookload limit to be equal to the sum of the first hookload limit and the allowable change based on a positive determination that the difference exceeds the allowable change.

13. The method of claim 11, further comprising the step of adjusting the second hookload limit to be equal to a difference of the first hookload limit and the allowable change based on a positive determination that the difference between the first hookload limit and the second hookload limit exceeds the allowable change.

14. The method of claim 1, further comprising the steps of:

determining with the computer system if the second hookload limit is greater than or equal to a maximum derrick hookload limit; and adjusting the second hookload limit to be equal to the maximum derrick hookload limit.

15. The method of claim 1, further comprising the steps of:

determining with the computer system if the second hookload limit is less than or equal to a minimum hookload limit; and adjusting the second hookload limit to be equal to the minimum hookload limit.

16. A method for controlling hookload on a well service rig comprising the steps of:

conducting a first cycle of an activity at a well;

accepting a first set of load-based data during the first cycle at a computer system;

determining with the computer system a hookload limit for the well service rig; and conducting a second cycle of the activity subsequent to the first cycle at the well service rig; and accepting a second set of load-based data during the second cycle; and comparing at least a portion of the second set of load-based data to the hookload limit.

17. The method of claim 16, further comprising the step of preventing the second cycle from being completed if any portion of the second set of load based is greater than the hookload limit.

18. The method of claim 16, further comprising the steps of:

accepting a first measured weight limit at the computer system;

accepting well service rig weight data during the first cycle of the activity;

accepting measured weight data during the first cycle of the activity, wherein the measured weight is a sum of the well service rig weight and a hook load on the well service rig;

with the computer system, comparing each measured weight data value to the first measured weight limit;

stopping the first cycle of the activity if at least one of the measured weight data values is greater than the first measured weight limit;

determining with the computer system a first average well service rig weight;

calculating with the computer system a second measured weight limit, wherein the second measured weight limit is the sum of the second hookload limit and the first average well service rig weight.

19. A method for controlling hookload on a well service rig comprising the steps of:

accepting a first hookload limit at the computer system;

conducting a first cycle of an activity at a well;

accepting a plurality of well service rig weight data points during the first cycle of the activity;

accepting a plurality of measured weight data points during the first cycle of the activity, wherein the measured weight is the sum of the well service rig weight and a hookload weight;

determining with the computer system, a plurality of hookload data values by calculating the difference of at least a portion of each of a plurality of measured weight data points and at least a portion of each of a plurality of well service rig weight data points with the computer system, comparing at least a portion of the hookload data points to the first hookload limit;

determining with the computer system a first average well service rig weight based on at least a portion of the plurality of well service rig weight data points;

determining with the computer system a first average measured weight based on at least a portion of the plurality of measured weight data points;

determining with the computer system a first average hookload by calculating the difference of the first average measured weight and first average well service rig weight;

calculating with the computer system an overpull value as the difference of the first hookload limit and the first average hookload;

calculating with the computer system a second hookload limit based on the first average hookload and an overpull value;

conducting a second cycle of the activity at the well;

accepting a second set of hookload data during the second cycle; and comparing at least a portion of the hookload data values in the second set of hookload data to the second hookload limit.

* * * * *